(12) United States Patent
Eriksson-Ahuja

(10) Patent No.: US 10,759,589 B2
(45) Date of Patent: Sep. 1, 2020

(54) CONTAINER FOR STORING MOISTURE LEVEL-SENSITIVE PRODUCTS

(71) Applicant: PYAR LTD, London (GB)

(72) Inventor: Asa Eriksson-Ahuja, London (GB)

(73) Assignee: PYAR LTD, London (GB)

( * ) Notice: Subject to any disclaimer, the term of this patent is extended or adjusted under 35 U.S.C. 154(b) by 212 days.

(21) Appl. No.: 15/577,164

(22) PCT Filed: Apr. 26, 2016

(86) PCT No.: PCT/EP2016/059255
§ 371 (c)(1),
(2) Date: Nov. 27, 2017

(87) PCT Pub. No.: WO2016/188690
PCT Pub. Date: Dec. 1, 2016

(65) Prior Publication Data
US 2018/0178966 A1   Jun. 28, 2018

(30) Foreign Application Priority Data

May 28, 2015   (AT) .............................. A 50436/2015

(51) Int. Cl.
*B65D 81/22*   (2006.01)
*B01D 53/26*   (2006.01)
(Continued)

(52) U.S. Cl.
CPC ........... *B65D 81/22* (2013.01); *B01D 53/261* (2013.01); *B65D 81/266* (2013.01); *A23L 3/40* (2013.01);
(Continued)

(58) Field of Classification Search
CPC ...... B65D 81/22; B65D 81/266; B65D 85/76; B01D 53/261; B01D 2253/106; A23L 3/40; A23V 2002/00
(Continued)

(56) References Cited

U.S. PATENT DOCUMENTS 1,026,154 A * 5/1912 Doughty .............. B65D 81/266
312/31
2,863,647 A * 12/1958 Townsend ................ F23M 7/00
220/304

(Continued)

FOREIGN PATENT DOCUMENTS

CH   254991    5/1948
CN   2083855   9/1991
(Continued)

OTHER PUBLICATIONS

International Search Report dated Oct. 5, 2016 by the European Patent Office in International Application PCT/ep2016/059255.

*Primary Examiner* — Andrew D Perreault
(74) *Attorney, Agent, or Firm* — Henry M. Feiereisen LLC

(57) ABSTRACT

The invention relates to a container (100) for the storage of products sensitive to the degree of humidity (5), in which are arranged at least two adjacent inner spaces (2, 3) having atmospheres (20, 30) in them that are connected via a plurality of atmosphere connection and exchange elements, particularly bridges, in order to have a unified overall atmosphere (230), having only a defined degree of humidity without local humidity gradients, and that cannot be influenced by the outside atmosphere (Aa), whereby one (2) of the two inner spaces (2, 3), namely that provided for the long term reception and storage of the products sensitive to the degree of humidity (5) whose quality is to be preserved in full, preferably has a substantially cubic shape with flat inner (Continued)

walls (201 to 204) or with a substantially cylindrical concave shape in order to form a substantially self-contained complete wall (200), against the outside atmosphere and having a substantially higher volume, than the at least one other flat inner space (3) with a relatively smaller volume, which can also be sealed tight against the outside atmosphere (Aa), and which is intended to receive and store a humidity regulation means (4).

3 Claims, 24 Drawing Sheets

(51) Int. Cl.
    *B65D 81/26*     (2006.01)
    *B65D 85/76*     (2006.01)
    *A23L 3/40*     (2006.01)

(52) U.S. Cl.
    CPC .... *A23V 2002/00* (2013.01); *B01D 2253/106* (2013.01); *B65D 85/76* (2013.01)

(58) Field of Classification Search
    USPC .......................................... 220/501; 206/204
    See application file for complete search history.

(56) References Cited

U.S. PATENT DOCUMENTS

| | | | |
|---|---|---|---|
| 4,116,354 A * | 9/1978 | Kenkare | B01F 13/002 206/219 |
| 4,509,412 A * | 4/1985 | Whittenburg | A47J 27/04 126/20 |
| 5,114,003 A | 5/1992 | Jackisch et al. | |
| 2009/0145783 A1 | 6/2009 | Forker | |
| 2013/0334074 A1 | 12/2013 | Wada et al. | |
| 2015/0136618 A1 | 5/2015 | Patel et al. | |

FOREIGN PATENT DOCUMENTS

| | | |
|---|---|---|
| CN | 201271175 | 7/2009 |
| FR | 966 606 | 10/1950 |
| FR | 2 517 279 | 6/1983 |
| WO | WO 2012/049546 | 4/2012 |
| WO | WO 2012/087318 | 6/2012 |

\* cited by examiner

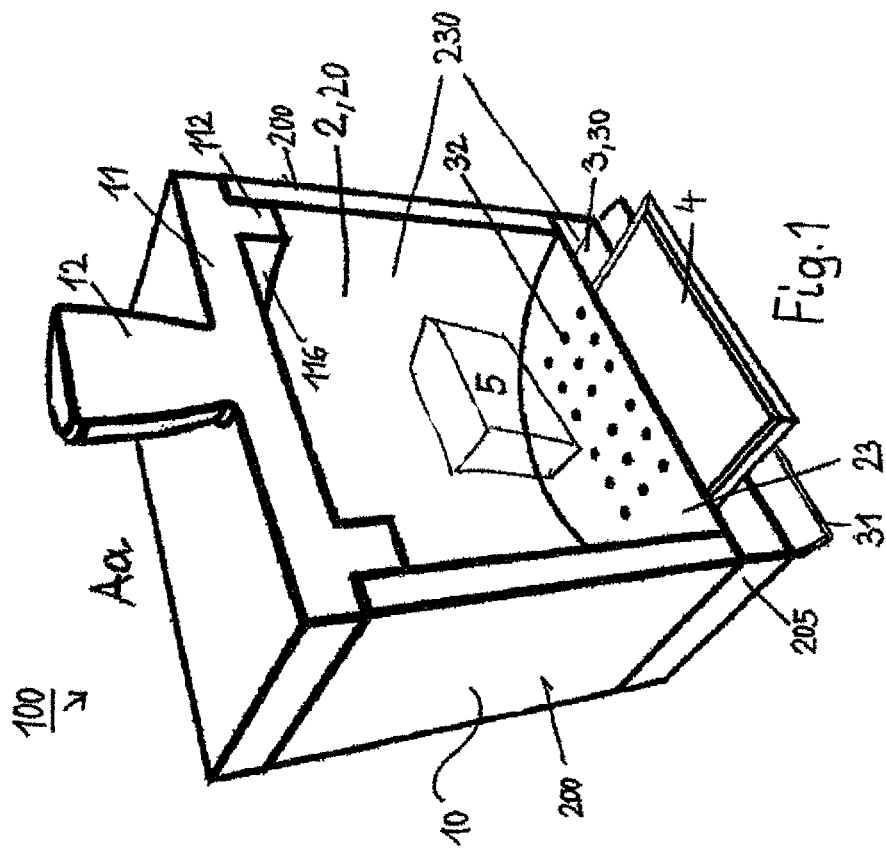
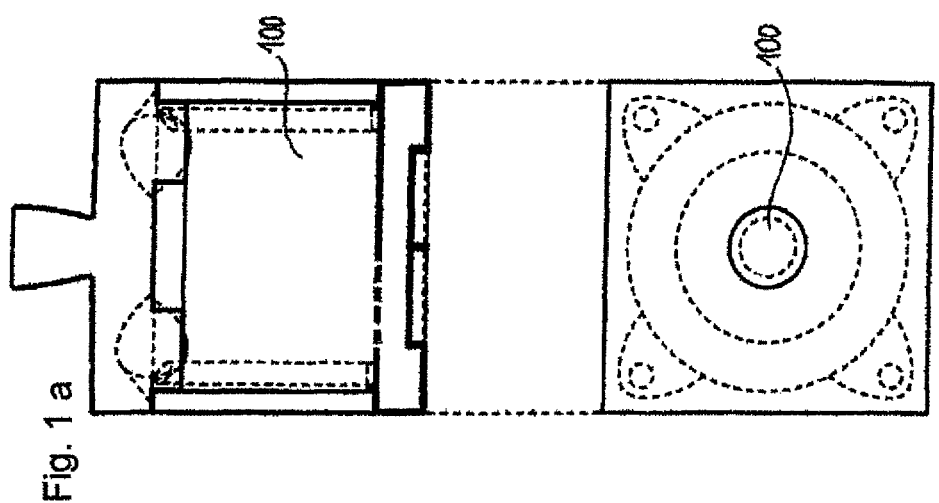

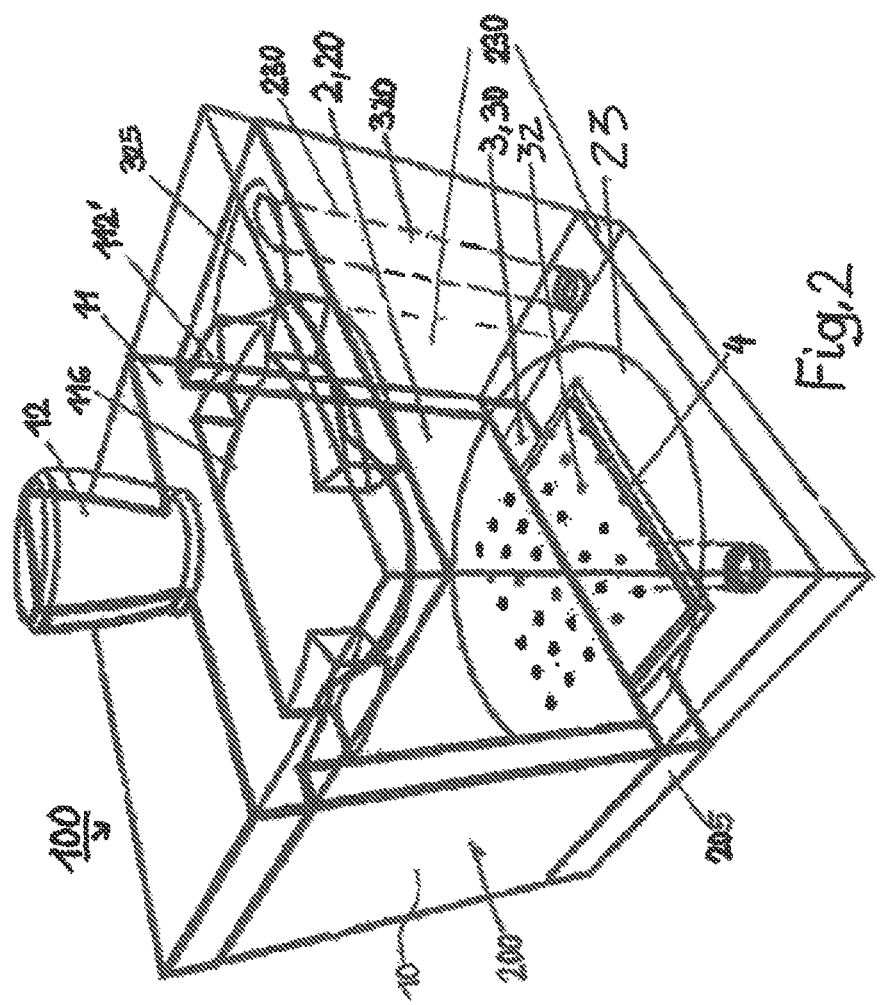
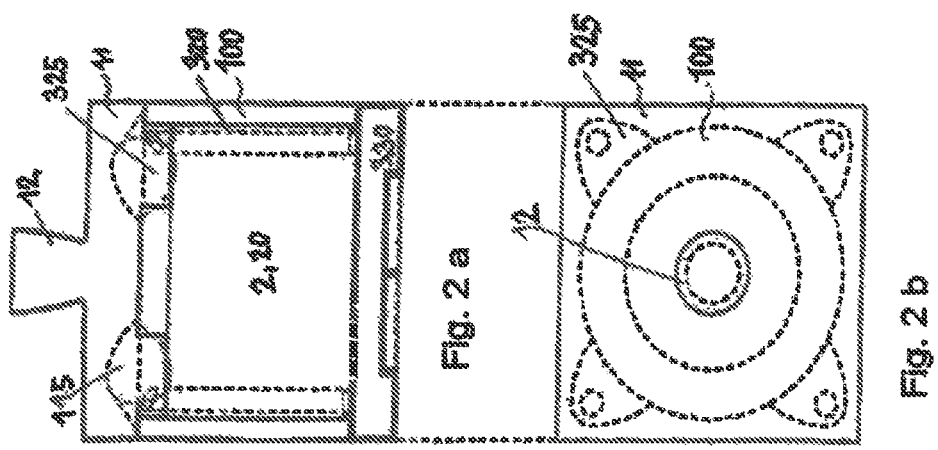

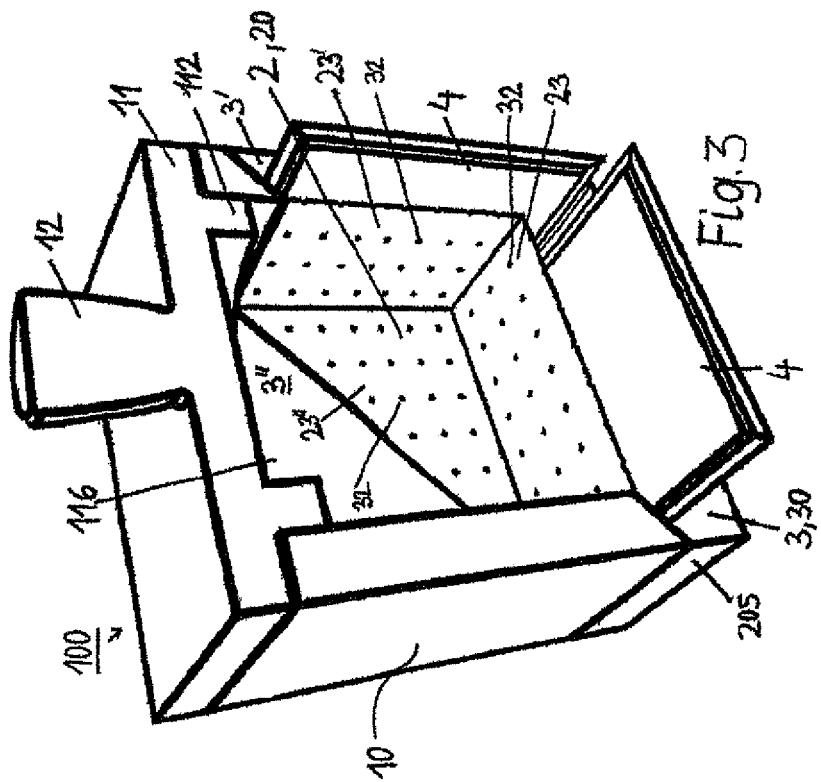
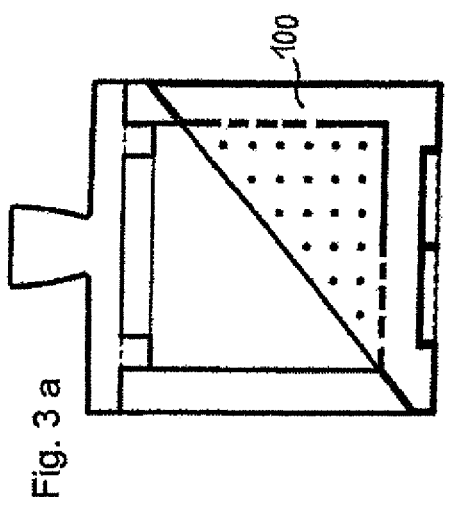
Fig. 3a
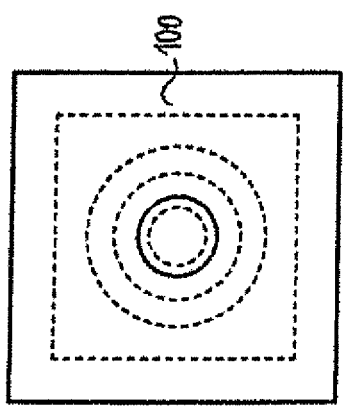
Fig. 3b

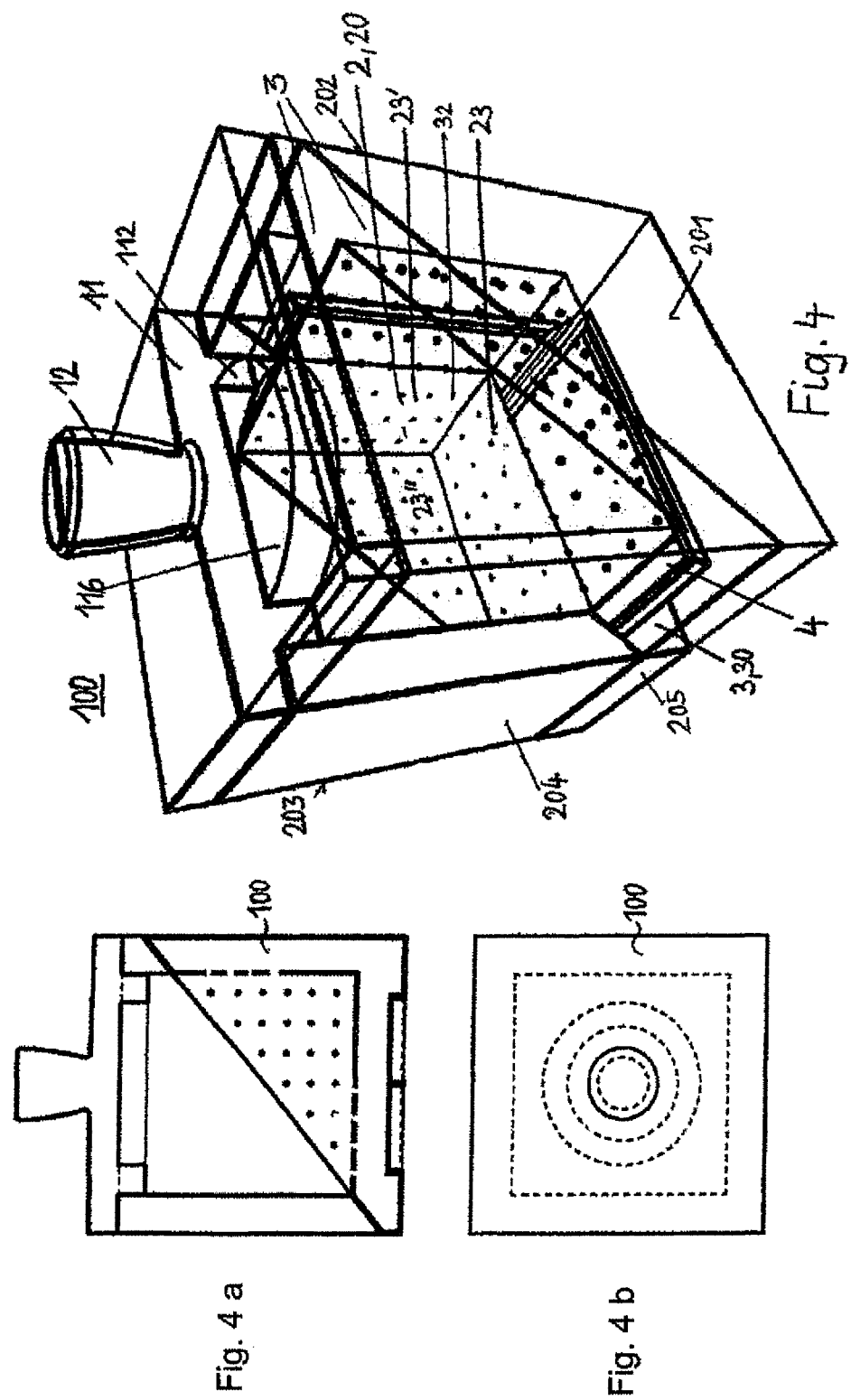

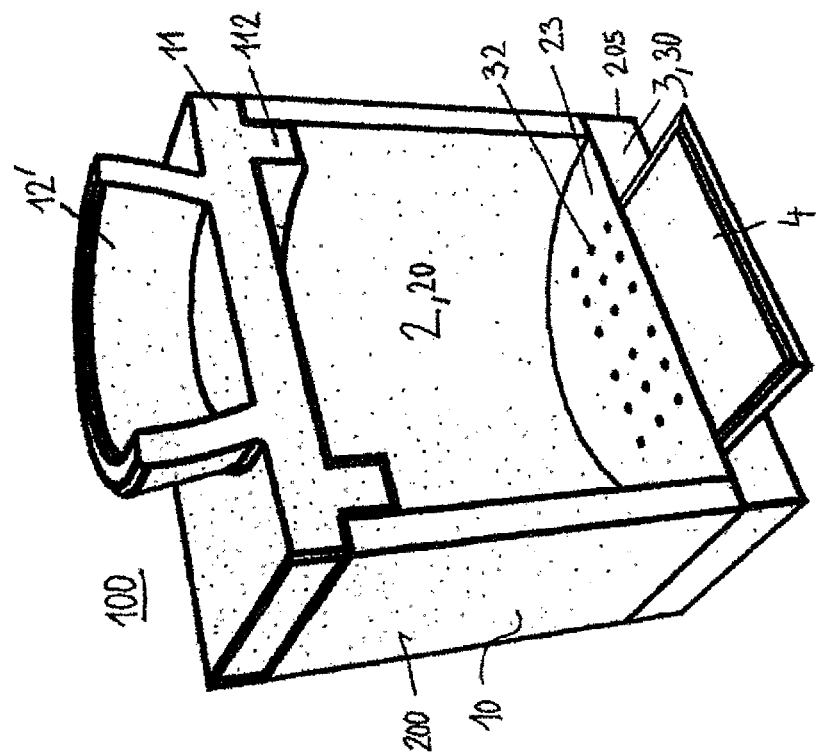
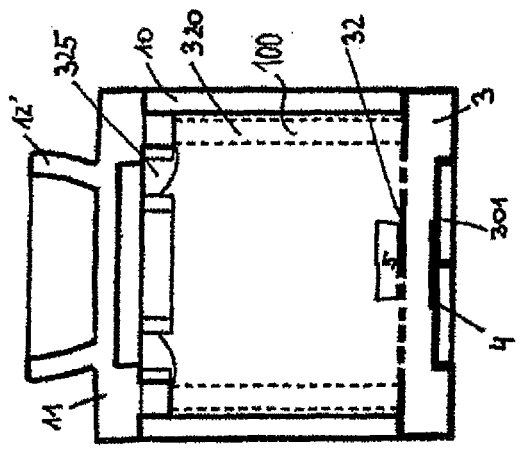
Fig. 5a
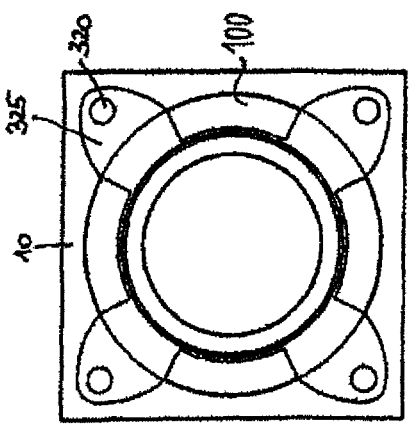
Fig. 5b

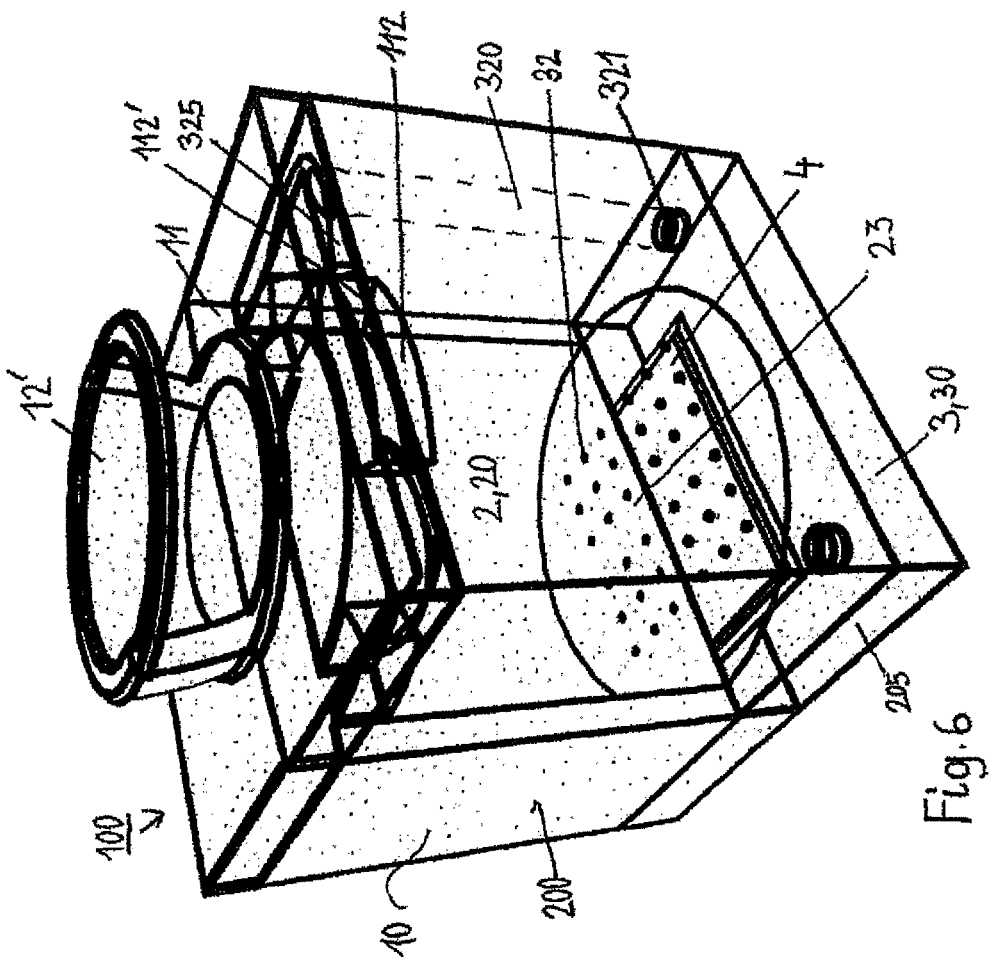
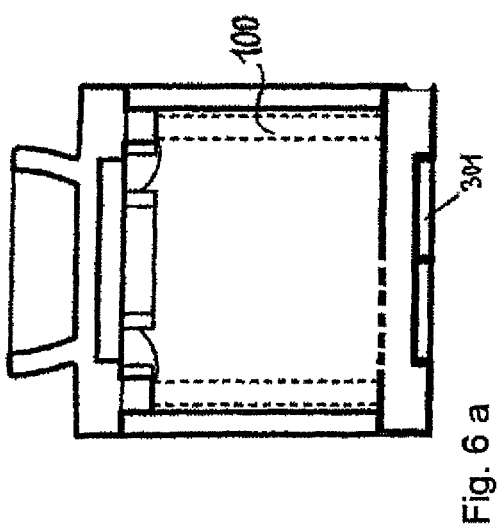
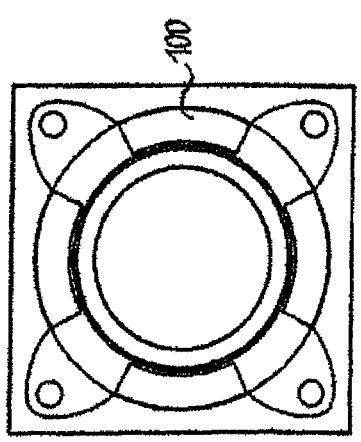

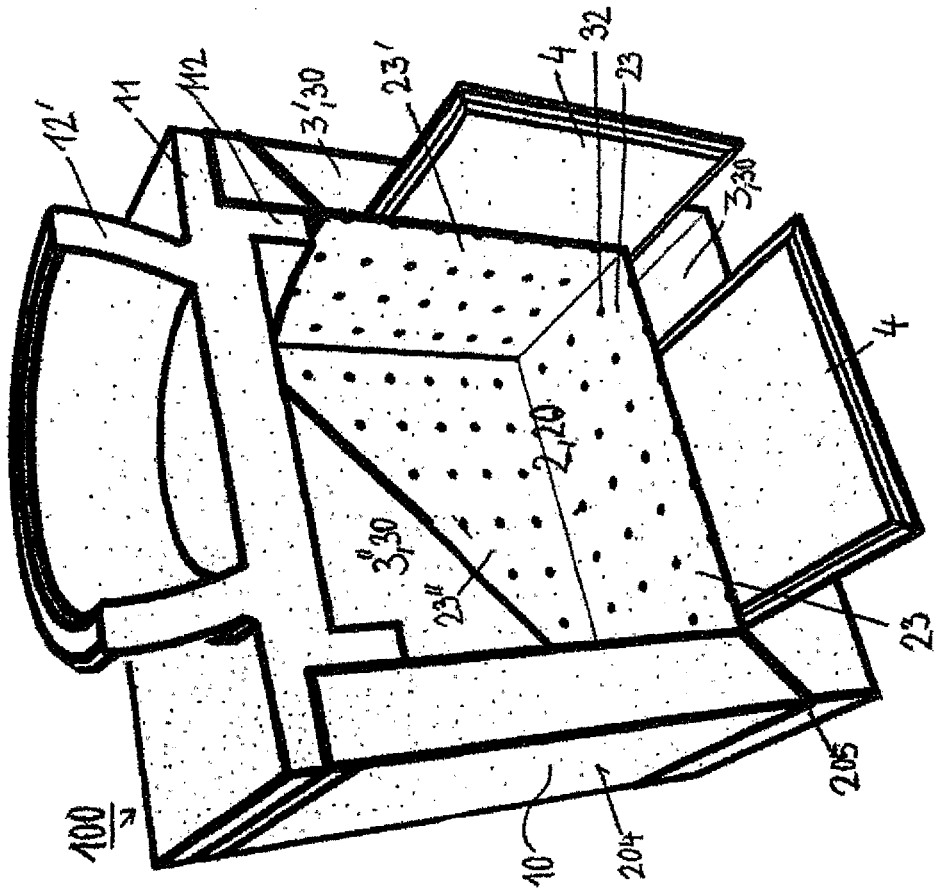
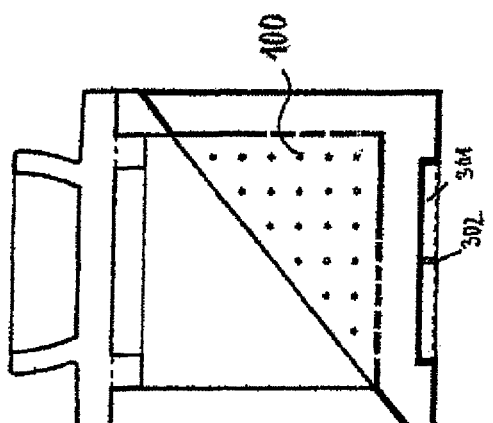
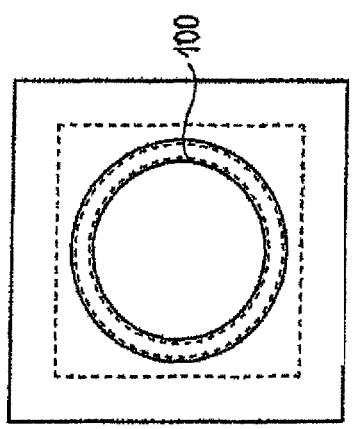

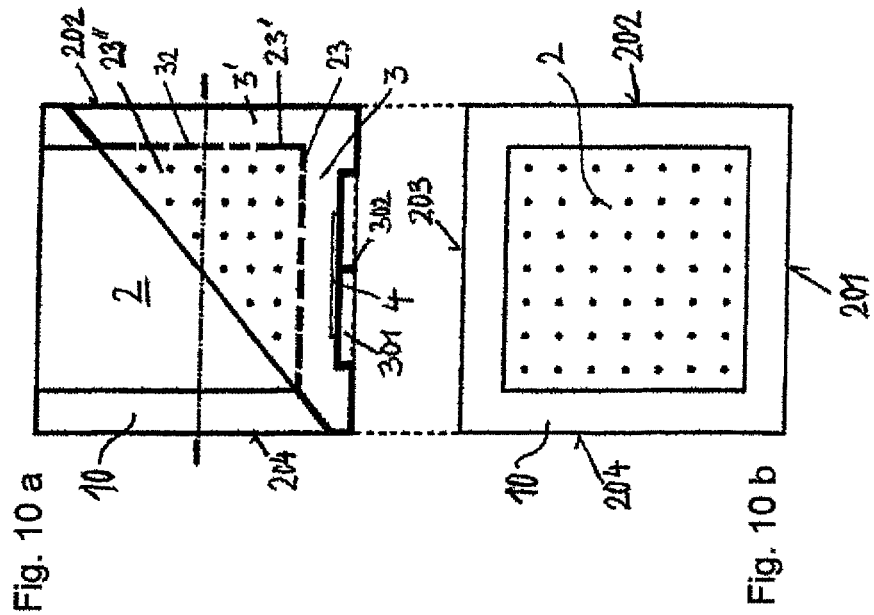
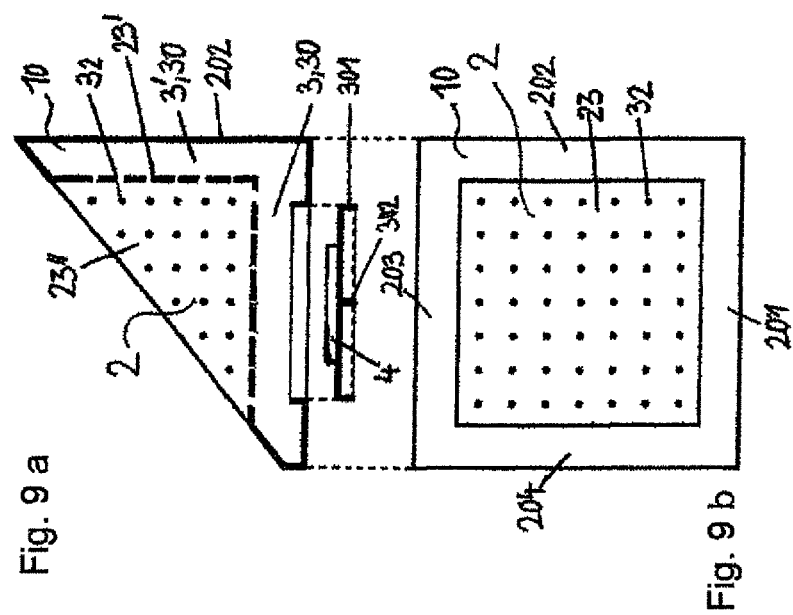

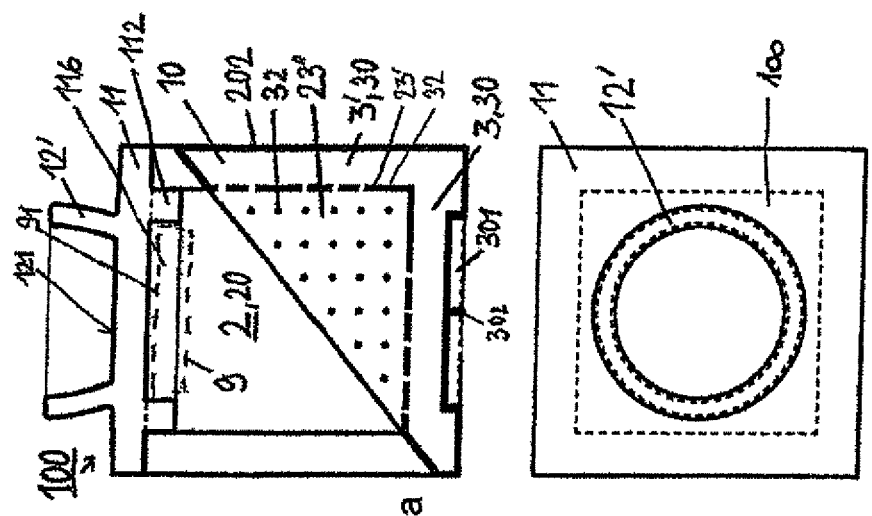
Fig. 12 a
Fig. 12 b
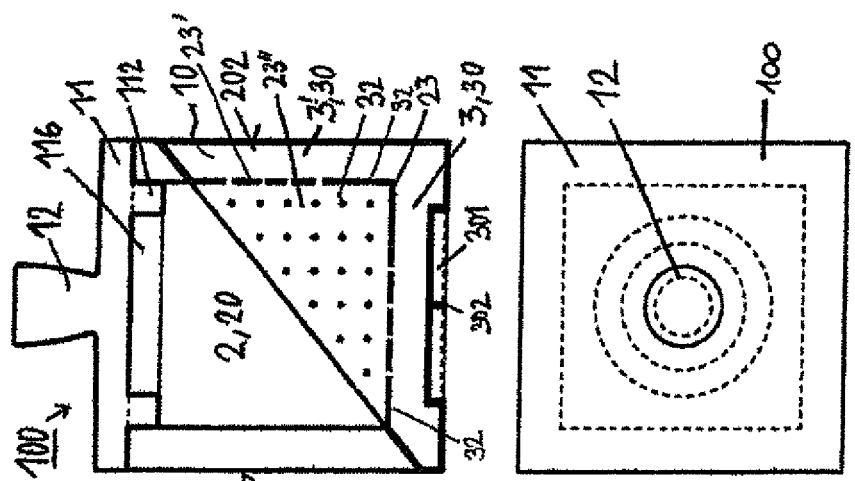
Fig. 11 a
Fig. 11 b

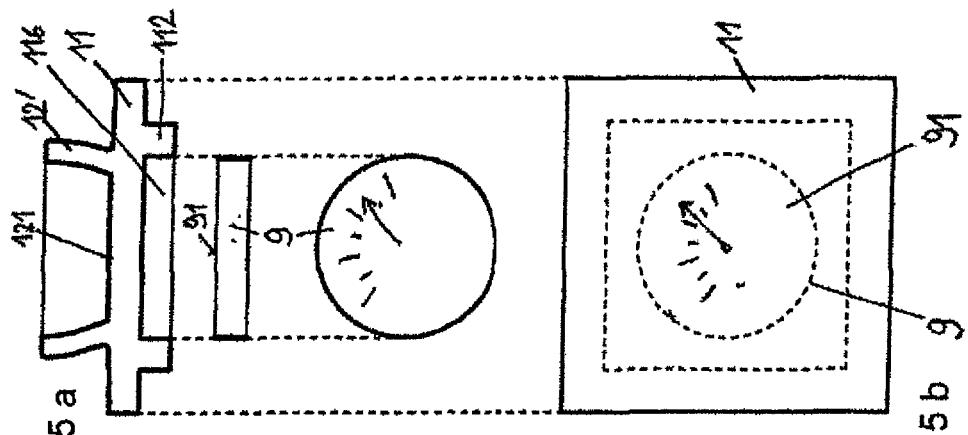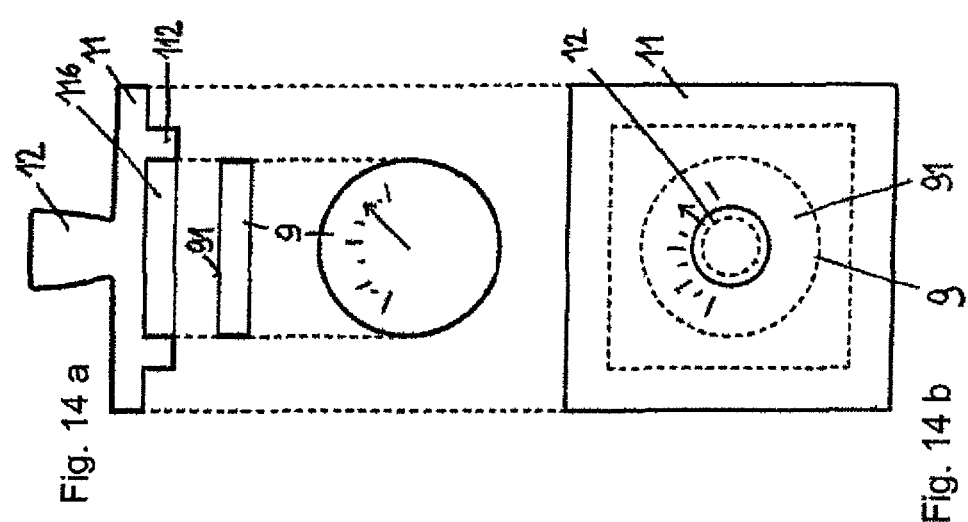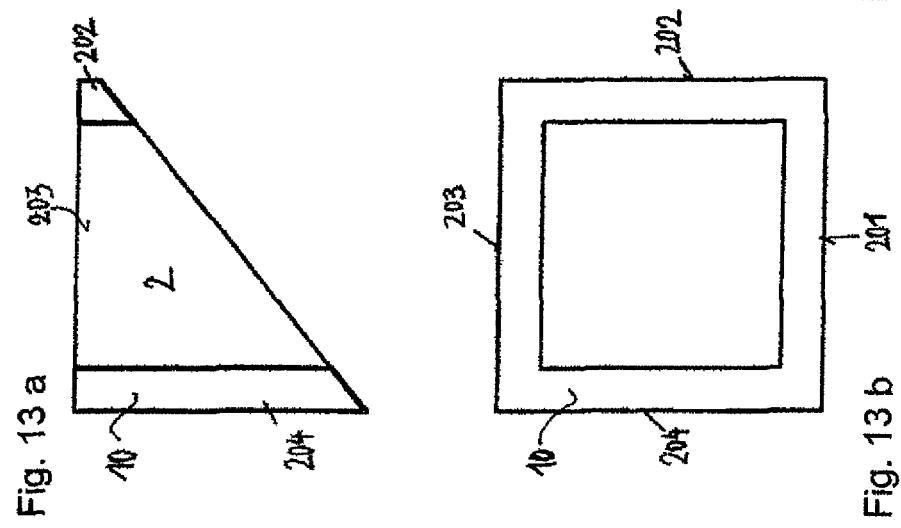

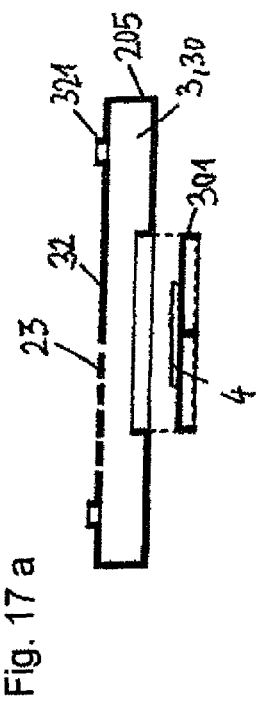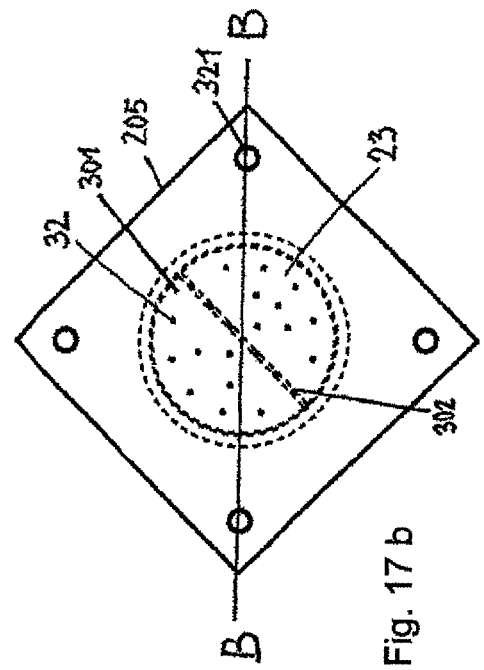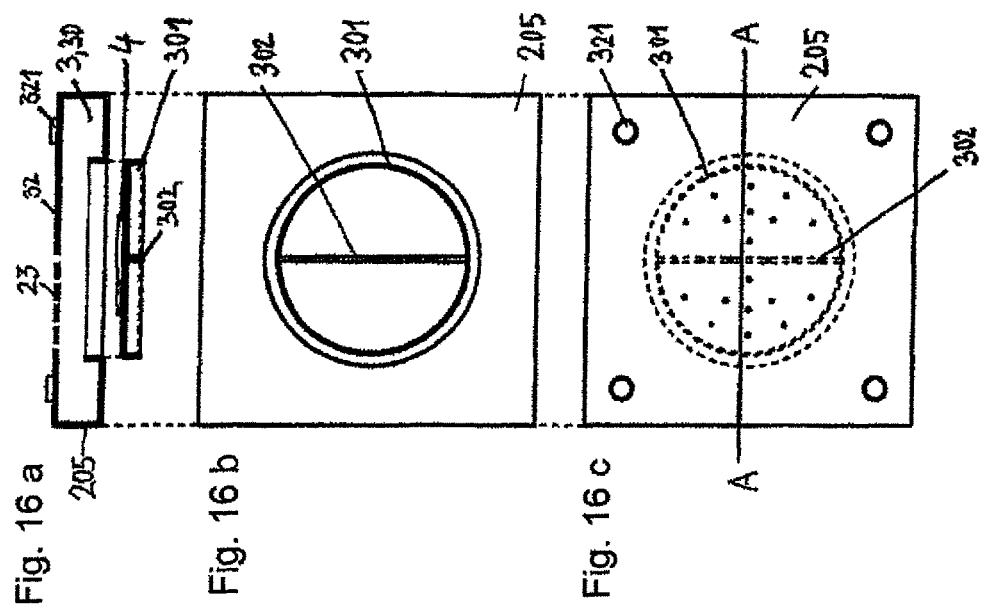

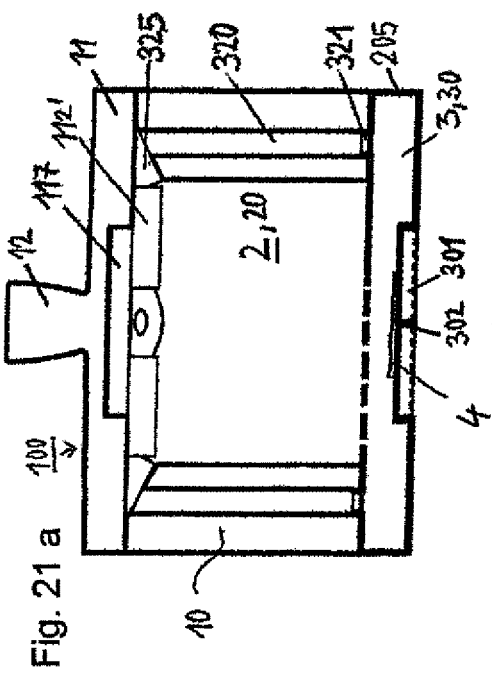
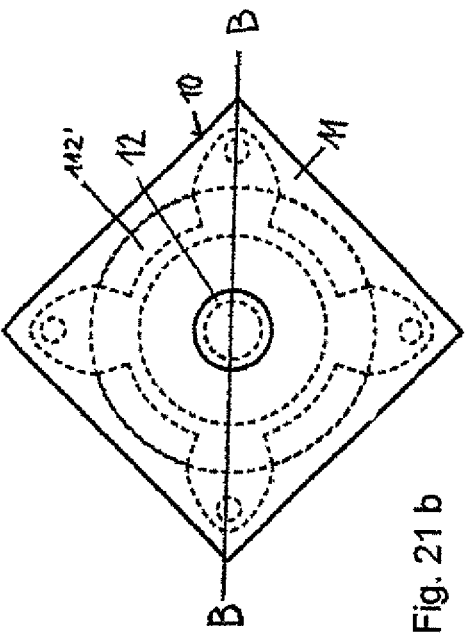
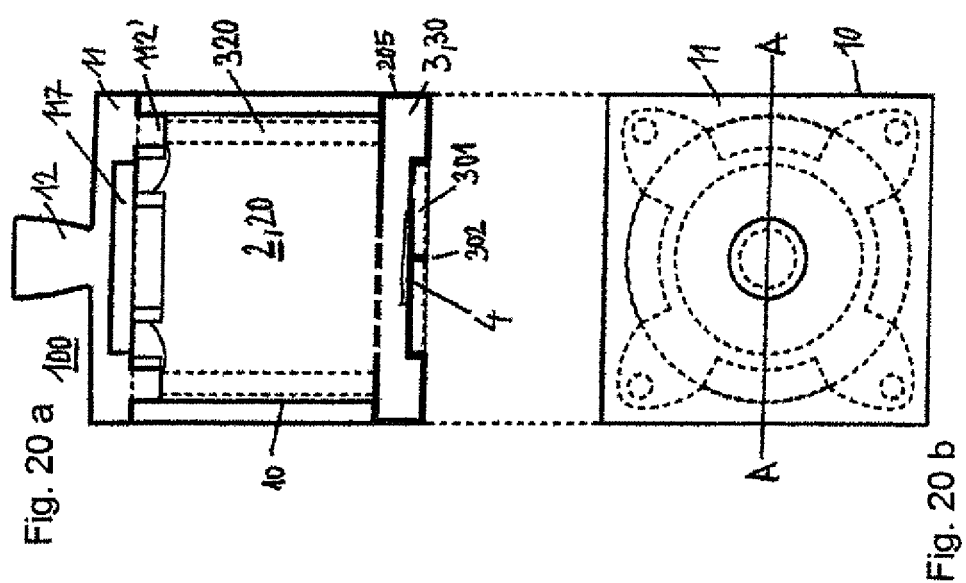

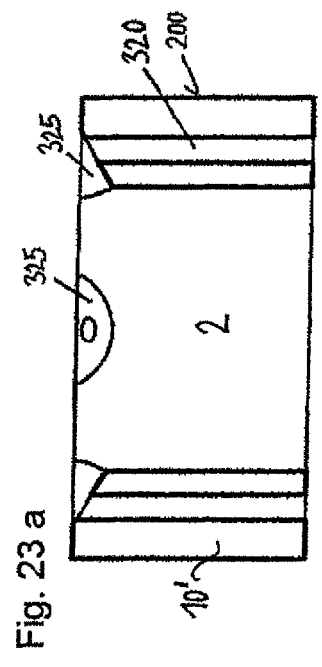
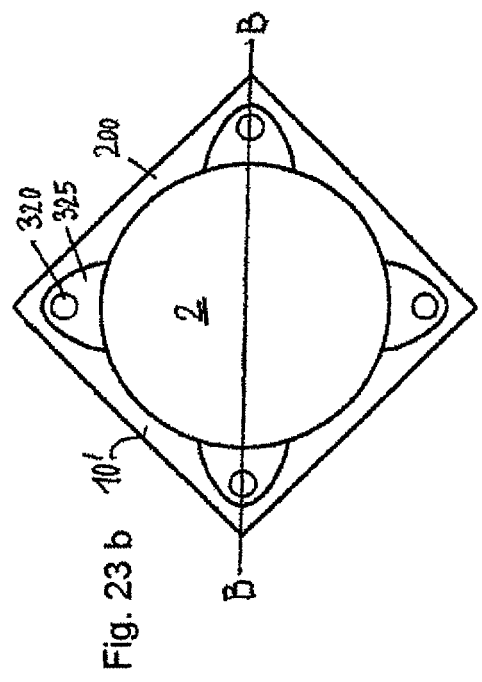
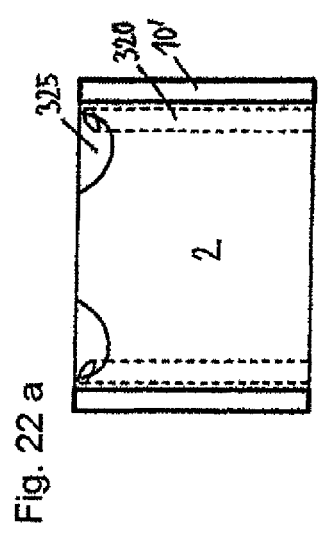
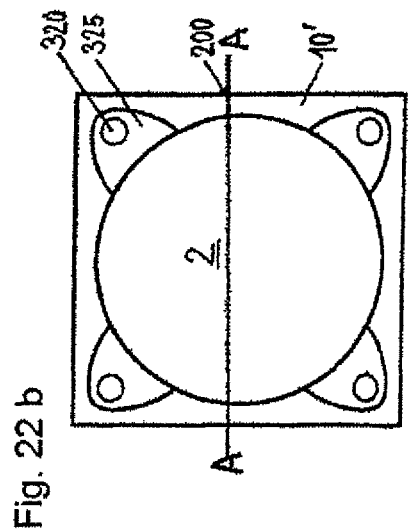

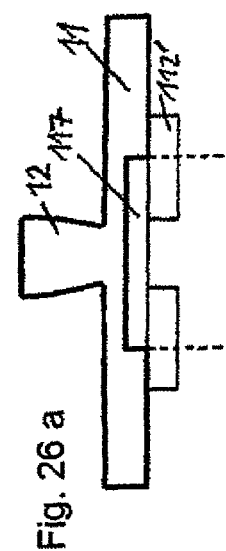
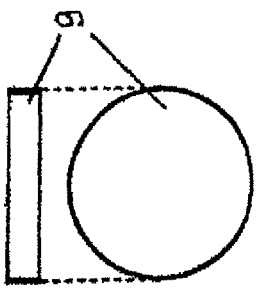
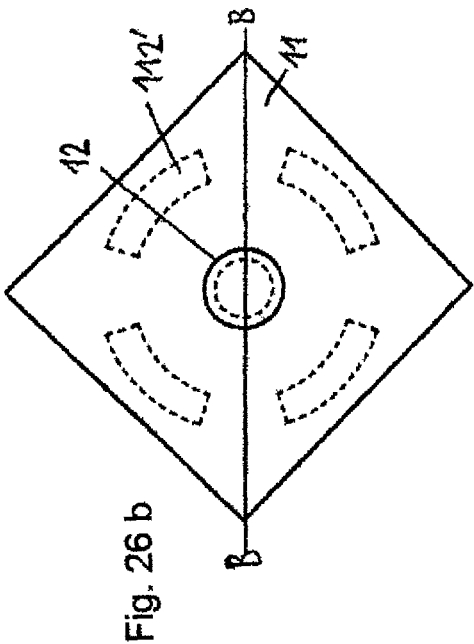
Fig. 26 a
Fig. 26 b
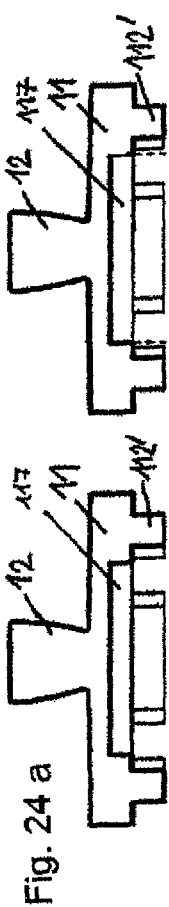
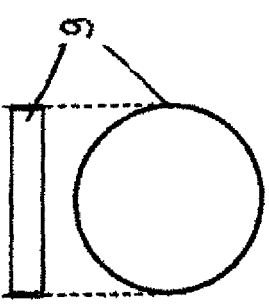
Fig. 25
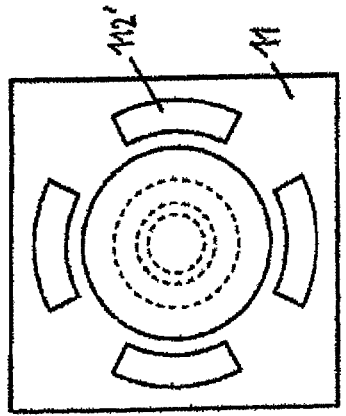
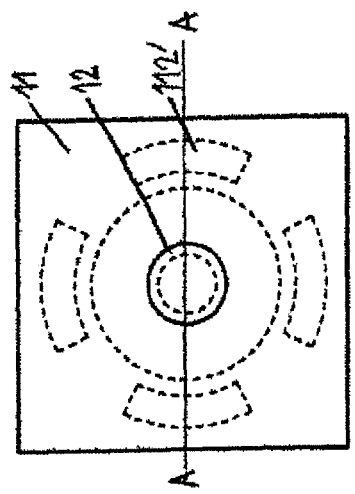
Fig. 24 a
Fig. 24 b
Fig. 24 c

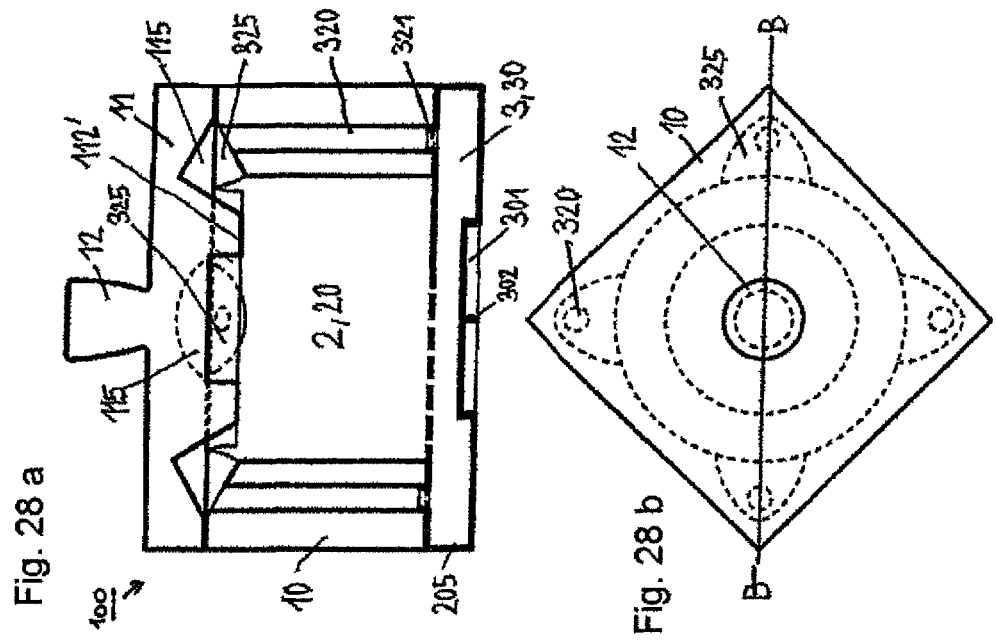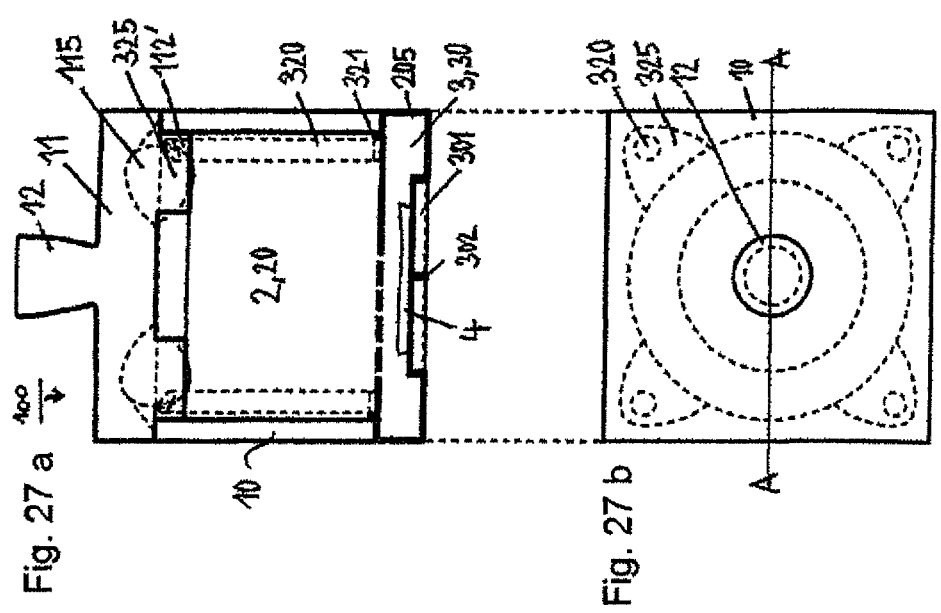

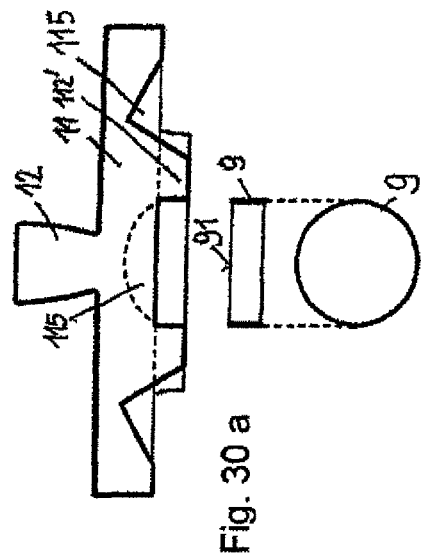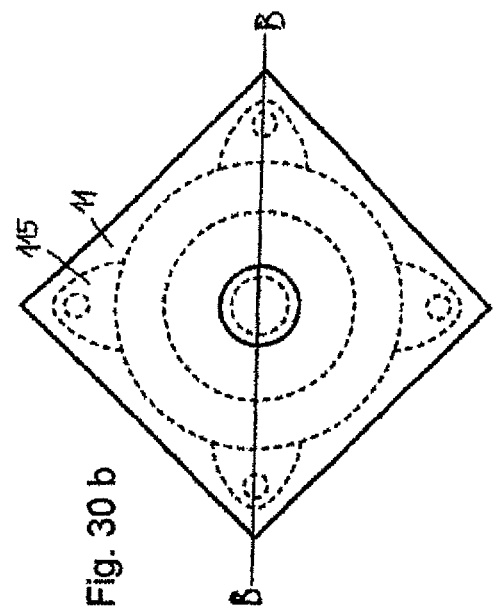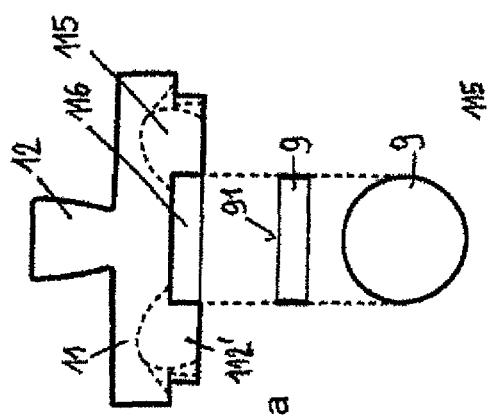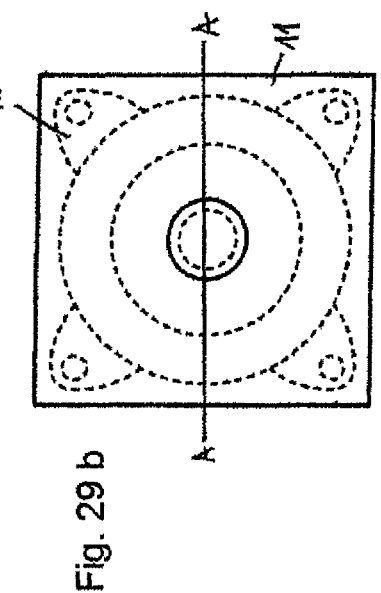

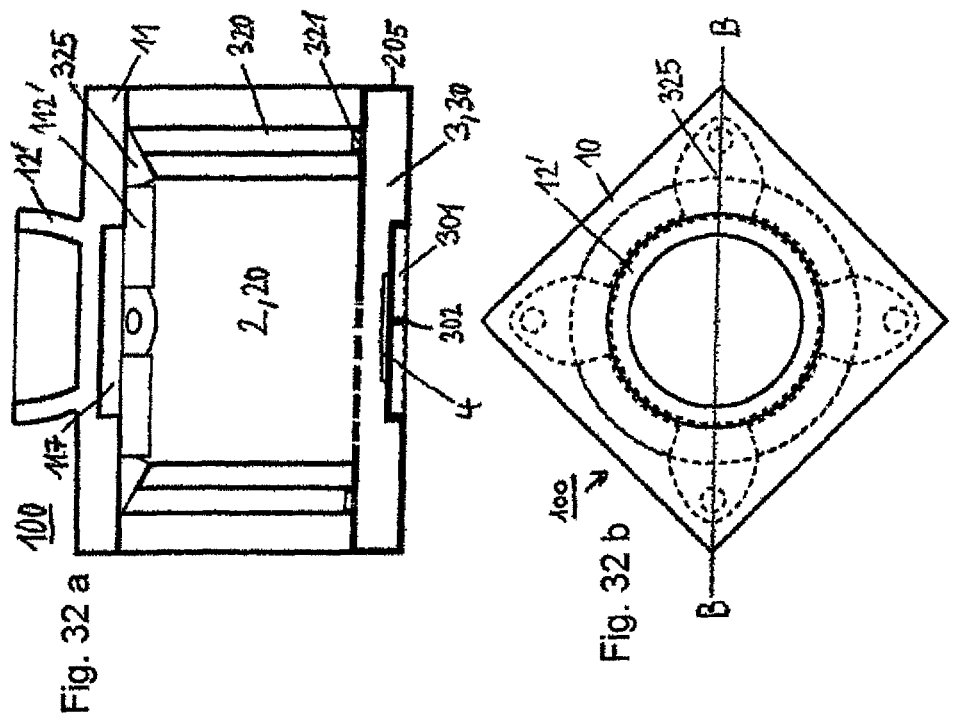
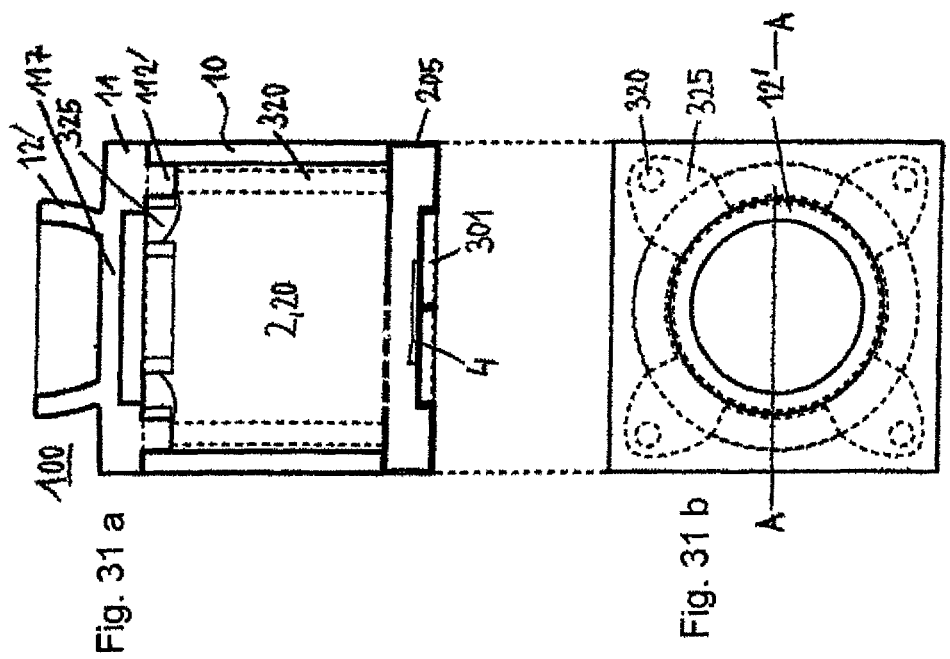

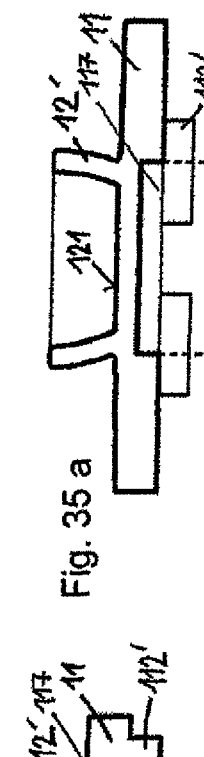
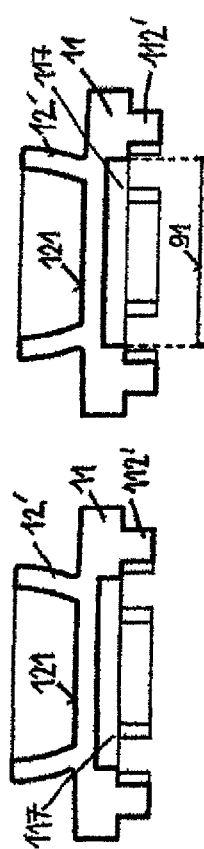
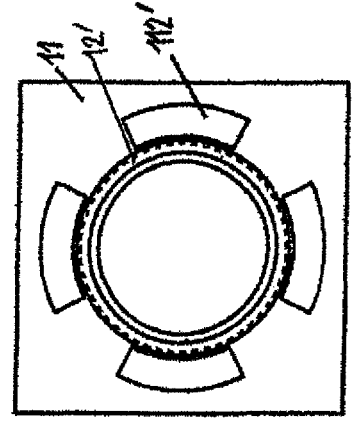
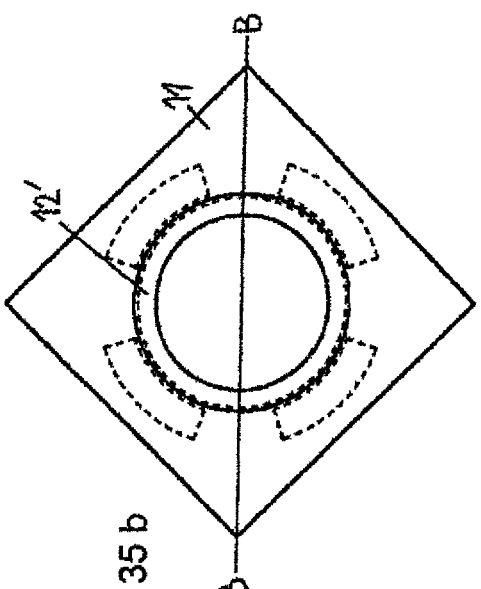
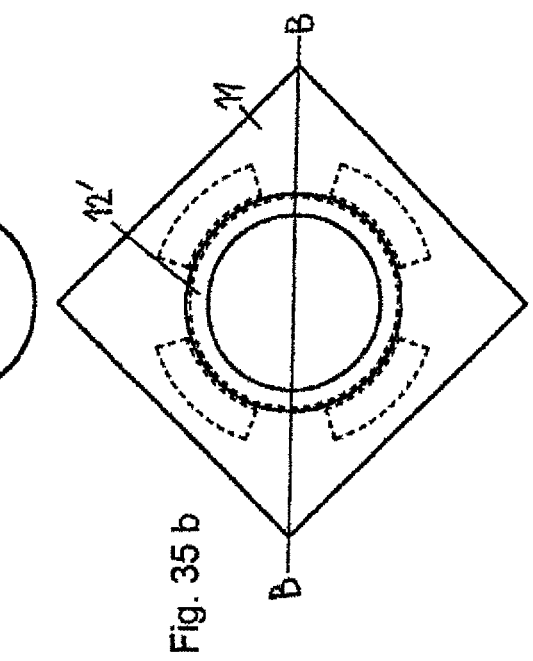
Fig. 33 a
Fig. 33 b
Fig. 33 c
Fig. 34
Fig. 35 a
Fig. 35 b

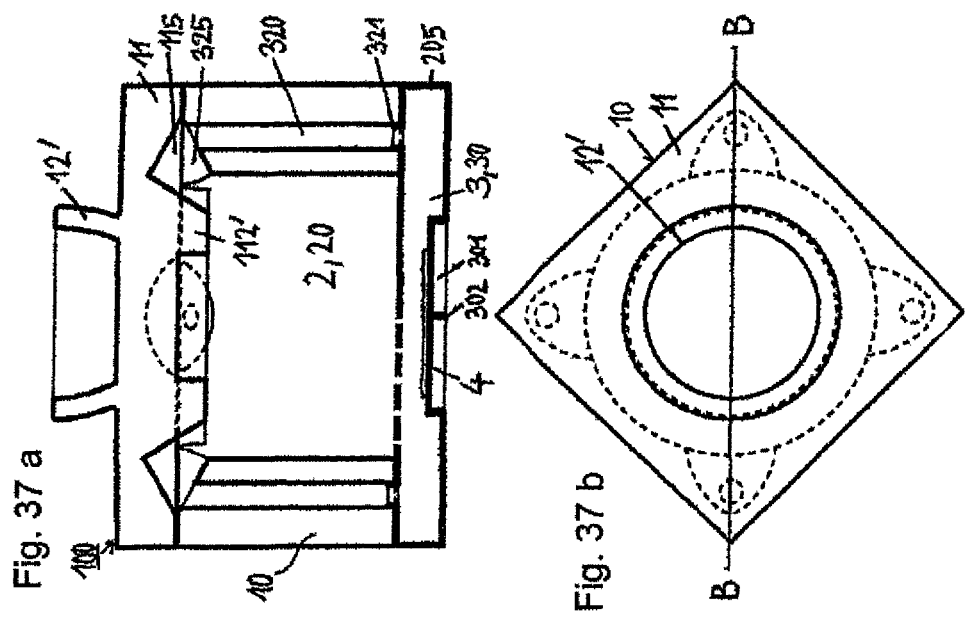
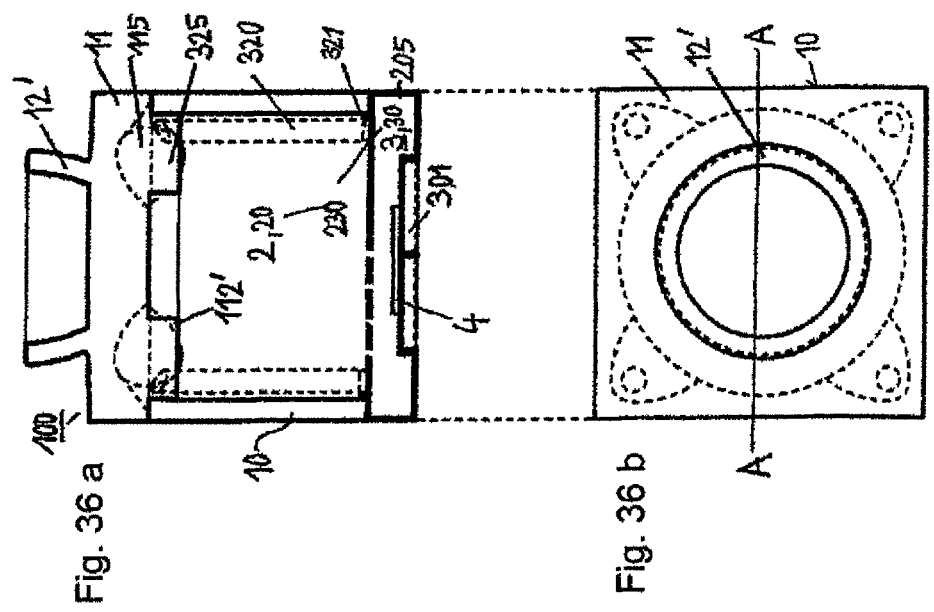

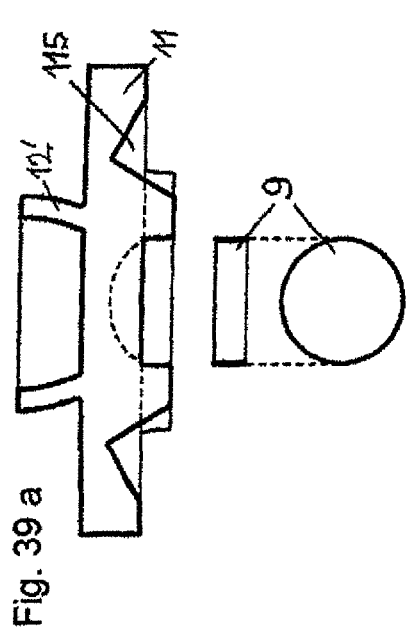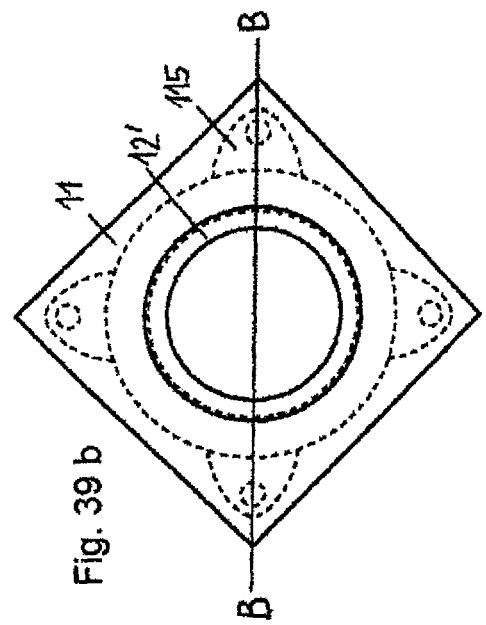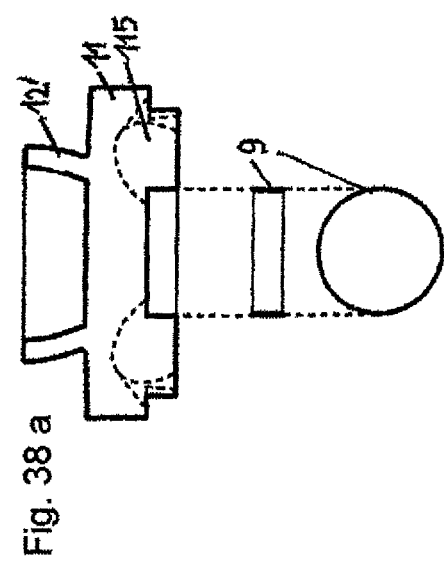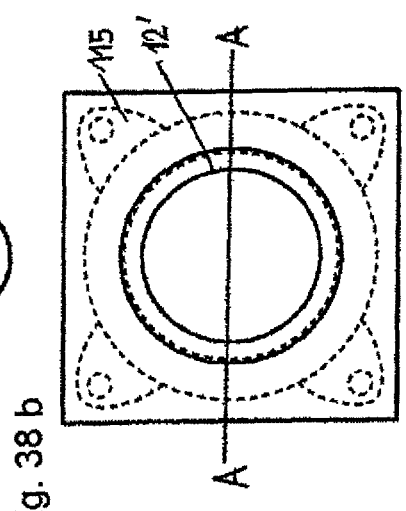

CONTAINER FOR STORING MOISTURE LEVEL-SENSITIVE PRODUCTS

CROSS-REFERENCES TO RELATED APPLICATIONS

This application is the U.S. National Stage of International Application No. PCT/EP2016/059255, filed Apr. 26, 2016, which designated the United States and has been published as International Publication No. WO 2016/188690 and which claims the priority of Austrian Patent Application, Serial No. A50436/2015, filed May 28, 2015, pursuant to 35 U.S.C. 119(a)-(d).

BACKGROUND OF THE INVENTION

The present invention relates to a novel container for the establishment and maintenance of the respective optimum degree of humidity of the prevailing inner atmosphere and, therefore, the full retention of the specific flavour, special taste, special texture and feel and/or the like, during the storage of products of all kinds, especially of the food and beverages sector, among which can be mentioned—by no means exhaustively—edible and/or perishable products and/or products capable of losing their specific character, such as, for example, herbs, spices, teas, caviar, truffles, special cheese, sausage and meat products.

For simplicity; the products mentioned above are referred to below as "products sensitive to the degree of humidity". However, it may happen that these products are also temperature sensitive.

There are already a variety of proposals available for containers for the conservation and stabilisation of the humidity content of tobacco and this has also resulted in humidors.

In this connection, for example, reference is made to US 2015/136618 A1 and US 2013/334074 A1, from which the principle of drying goods and keeping them dry in an enclosed space is known.

SUMMARY OF THE INVENTION

In the case of the new container for the conservation and storage of products sensitive to the degree of humidity mentioned above—taking into account the specific characteristics and needs of each of these products, while teas of different varieties are only taken here as an example—the invention provides for a container preferably made of a transparent material, in particular crystal-glass or translucent polymer, preferably substantially having a cubic or cylindrical outer shape or outer configuration, whereby at least two adjacent inner spaces are arranged to have atmospheres in them that are connected via a plurality of atmosphere connection and exchange elements, particularly bridges, in order to have a unified overall atmosphere having only a defined degree of humidity without local humidity gradients, and that cannot be influenced by the outside atmosphere, whereby one of the two inner spaces, namely that provided for the long term reception and storage of the products whose quality is to be preserved in full, preferably has a substantially cubic shape with flat inner walls or with a substantially cylindrical concave shape in order to form a substantially self-contained complete wall, which has a removable but tight sealing cap against the outside atmosphere, and having a substantially higher volume than the— at least one—other flat inner space with a relatively smaller volume, which can also be sealed tight against the outside atmosphere, and which is provided to receive and store a humidity regulation means. The expression "outer shape" appearing above means "externally visible geometric configuration" and appears with this meaning throughout the entire description of the invention.

Due to the special design and the connection of its various inner spaces with each other, the new container is, for the first time, actually capable of maintaining the atmosphere surrounding the products to be contained therein, such as tea, tea bricks or the like, at constant and optimum values of the appropriate degree of humidity, in any event for the particular product, for example, tea.

Thus, a container is advantageously provided such that the atmosphere connection and exchange elements, especially bridges, are formed in a multiple of, at least one, in particular flat, separating walls between the inner space for storage of the products sensitive to the degree of humidity and the, at least one, inner space for receiving the humidity regulation means, whereby atmosphere connection recesses, holes, channels or the like are formed in the separating wall.

In this case, especially with respect to any odour-emitting degradation, it is advantageous if there is at least a separating wall with the atmosphere connection recesses, holes, tubules or the like passing through, between the inner space for storage of products sensitive to the degree of humidity and the, at least one, inner space to house the humidity regulation means made of odourless stainless steel that is preferably coated on both sides with precious metal, especially gold or palladium.

It is particularly advantageous, in order to have the same constant humidity-containing atmosphere everywhere in the inner space for storage of the products sensitive to the degree of humidity, i.e. in each space element, if the atmosphere connection recesses, holes, channels or the like in the respective separating wall have an opening angle of between 80 and 60° with respect to the inner space for storage of the product to be conserved.

According to a particular embodiment of the new container, the said separating wall has a circular form, while the axes of the atmosphere connection recesses, holes, channels or the like, are each arranged radially outwards from the centre of the separating wall at angles continuously increasing from 0° to 25°, or 90° to 65° with respect to the plane or surface of the separating wall.

It has proved to be advantageous in practice if the separating wall is in the form of a wire net formed from odourless plastic and optionally additionally coated with precious metal.

Furthermore, it may be advantageous, in particular in order to achieve a high constancy of the humidity of the inner atmosphere within the inner space for the respective product sensitive to the degree of humidity, if the centre of the separating wall is arched upwards by an amount of up to 1.5 cm in the form of a spherical crown over the inner space for the storage of the product sensitive to the degree of humidity, i.e. convexly upwards.

A high degree of constancy of the overall atmosphere humidity may be achieved if, according to a first variant of the invention, the new container has an essentially cube-like geometric outer shape or outer configuration, or is in the form of a uniform four-sided prism, whereby the inner space for storage of the product sensitive to the degree of humidity has an essentially corresponding geometric cubic inner shape, and if, further, the preferably separate base with the inner space for storage of the product sensitive to the degree of humidity, is first formed with a separating wall with atmosphere connection recesses, holes, tubules or the like, while the (first) of the side walls of the said inner space is formed with a second such separating wall with atmosphere connection recesses, holes, tubules or the like, whereby a first inner space is arranged underneath the first base-forming horizontal separating wall, as well as a second inner space behind the second vertical separating wall, whereby each houses a humidity regulation means, and where, as appropriate, these two inner spaces have an atmosphere connection with one another, or if the container has an essentially cylindrical outer form or outer configuration whose inner space for storage of the product sensitive to the degree of humidity has an essentially cubic shape or configuration, whereby in the sectoral sub- spaces between the cylindrical outer wall and the cubic inner walls from the lower inner space, the separating wall with the atmosphere connection holes for the humidity regulation means, has at least two, especially four, widening atmosphere connection channels extending vertically upwards with respect to the head area of the inner space for the products sensitive to the degree of humidity.

The highest uniformity of humidity is obtained if the container, in addition to the two separating walls, as set forth above, and arranged in the base and in one of the side walls of the inner space for the storage of the product sensitive to the degree of humidity, has a third separating wall either laterally adjacent to the essentially vertical second side wall, or the opposing vertical separating wall constructed with atmosphere connection recesses, holes, or the like, behind which is arranged a third inner space to house a humidity regulating means.

An inventive container is cost-effective to manufacture, in particular if the atmosphere connection recesses, holes, channels or the like of the separating wall are in the same mutual arrangement and have a mutually identical design and/or if the humidity regulation means optionally present in the inner spaces are the same as one another.

A second advantageous embodiment variant of the new container for aroma neutral storage of products sensitive to the degree of humidity is that it has an essentially cube-like or a uniform four-sided prismatic shape, or a cylindrical geometric outer shape or outer configuration, and that its inner space for the storage of products sensitive to the degree of humidity has an essentially cylindrical shape, and, for atmosphere connection and exchange elements, has, in particular, bridges, atmosphere connection channels or the like, and at least two, preferably four, reinforced vertical inner edge or gusset areas of the container separated from the inner space, essentially parallel to the inside edge, whereby each is arranged under the inner space for storage of the products sensitive to the degree of humidity and separated from the same by the base thereof forming a separating wall of the inner space for the housing of the humidity regulation means, while at its upper end there is a shell-like cylindrical atmosphere exchange and connection channel widening obliquely downwards into the inner space for storage of the products sensitive to the degree of humidity, possibly slightly widening upwards, or having an essentially cylindrical outer shape or outer configuration with a cylindrical inner space for storage of the products sensitive to the degree of humidity, and with an inner space arranged under the inner space for the humidity regulation means, and the separating wall with the atmosphere connection recesses or holes in the direction of the inner space for products sensitive to the degree of humidity.

For the purpose of constancy of the humidity in containers of this embodiment variant, one preferably arranges that the inner space for storage of the products sensitive to the degree of humidity is separated from the humidity regulation means by a separating wall with atmosphere exchange and connection recesses, and that, from this last-named inner space, four atmosphere exchange and connection channels, separated from the inner space through correspondingly reinforced vertical inner edge regions, essentially with parallel inner edges, which, at their upper ends, are inclined approximately downwards to expand into the inner space for storage of the products sensitive to the degree of humidity.

It is preferably arranged in the case of this container for products sensitive to the degree of humidity that its upper side has an opening toward the inner space, and that the sealing cap—intended to seal it against the outer atmosphere—has an essentially hollow cylindrically-shaped protrusion projecting downwards into the said inner space for the products sensitive to the degree of humidity.

The humidity constancy may be still further supported by the fact that the opening to the inner space arranged in the upper side has a square cross-section, and that the sealing cap intended to seal tight against the outside atmosphere has four individual protrusions connected with one another and projecting downwards and whose sides are correspondingly arranged as a square, which have approximately shell-like extensions of the atmosphere connection and exchange canals in the vicinity of the square corners, are themselves rounded and likewise have approximately shell-like recesses.

When, as briefly stated in the introduction, the entire container, in particular the sealing cap of the inner space in the container for products sensitive to the degree of humidity, is made of a light-transparent, clear transparent glass or polymeric material, it is of particular advantage if there is provided inside a hollow cylindrical protrusion of the sealing cap, a flat cylindrical meter with a degree of humidity scale that is easily readable from outside or from above for regulation of the humidity in the inner space for storage of the products sensitive to the degree of humidity, and for the maintenance of the same quality of the humidity as the ambient atmosphere itself within a hollow cylindrical protrusion of the sealing cap and, if appropriate, the said meter may also measure and display the temperature in the inner space for storage of the products sensitive to the degree of humidity, in addition to the humidity. In this case, it is of even greater advantage in that the product sensitive to the degree of humidity and its current status may be directly observed and controlled at any time.

In the same manner, inside the hollow cylindrical protrusion or in a separate recess of the sealing cap, there is provided a modern sensor for determining the humidity content and/or the temperature in the inner space for storage of the product sensitive to the degree of humidity, with their respective values being displayed on a digital display device.

With respect to the configuration of the inner space to house the humidity regulation means, in an advantageous manner, this has at least one inner space as well as, optionally, further existing inner spaces to house the essentially flat-box-like humidity regulation means, and where this/ these inner space(s) to house the assembly is/are equipped with hinged flap-like sealing caps that may be opened and closed after assembly against the outside atmosphere, or a sealing cap may be provided underneath, on which the humidity regulation means may be positioned, whereby the assembly comprising the sealing cap and the humidity regulation means may be inserted, in particular screwed, to be sealed against the outer atmosphere from the base of the container, whereby the sealing cap with the inner space for the humidity regulation means is sealed, or which sealing cap can be screwed into a lower opening of the base, through which the humidity regulation means may be inserted in the base of the inner space following removal of the sealing cap.

A further variant has an inner space to house the humidity regulation means having an essentially flat box-like shape with a kind of drawer in which the humidity regulation means may be inserted and sealed against the outside atmosphere.

Ultimately, there results a complete storage set with a plurality of, in particular as described above, containers with different products or products of various kinds.

BRIEF DESCRIPTION OF THE DRAWING

FIGS. 1, 1a, 1b show a first embodiment of the novel container for the storage of products sensitive to the degree of humidity;

FIGS. 2, 2a, 2b show the same variant of this container;

FIGS. 3, 3a, 3b show a second variant of the same container;

FIGS. 4, 4a, 4b show a variant of the container shown in FIG. 3 each with a handle knob on its sealing cap;

FIGS. 5, 5a, 5b show another embodiment of the container, with the sealing cap having a shell-like handle;

FIGS. 5c, 5d, 5e show another embodiment of the container, with the sealing cap having a shell-like handle;

FIGS. 6a, 6b, 6c show another embodiment of the container, with the sealing cap having a shell-like handle;

FIGS. 6c, 6d, 6e show another embodiment of the container, with the sealing cap having a shell-like handle;

FIGS. 7a, 7b, 7c show another embodiment of the container, with the sealing cap having a shell-like handle;

FIGS. 9a, 9b, 10a, 10b show variants of two different containers,

FIGS. 11a, 11b, 12a, 12b show variants of two different containers,

FIGS. 13a, 13b, 14a, 14b, 15a, 15b show two variants of the sealing caps.

FIGS. 16a, 16b, 16c, 17a, 17b show the lower base of the new container with the downwardly opening insert or show the sealing cap for the introduction of the humidity regulation means;

FIGS. 20a, 20b, 21a, 21b show two vertical sectional views of the new product container;

FIGS. 22a, 22b, 23a, 23b show only the body of the same container;

FIGS. 24a, 24b, 24c, 25, 26a, 26b show three views of the sealing cap with a handle knob;

FIGS. 27a, 27b, 28a, 28b show a further such container with a differently shaped sealing cap for the humidity-regulated reception of products;

FIGS. 29a, 29b, 30a, 30b show the sealing cap;

FIGS. 31a, 31b 32a, 32b show two sectional views of the new container;

FIGS. 33a, 33b, 34, 35a, 35b show three sectional views of the sealing cap of the same container;

FIGS. 36a, 36b, 37a, 37b show another variant of the new container;

FIGS. 38a, 38b, 39a, 39b show two sectional views of the sealing cap

FIGS. 40 and 41 respectively show an entire humidor for the above-defined products sensitive to the degree of humidity, each with six individual containers for the aroma-neutral storage of six different varieties of a product sensitive to the degree of humidity, such as teas.

DETAILED DESCRIPTION OF PREFERRED EMBODIMENTS

Figure 5:
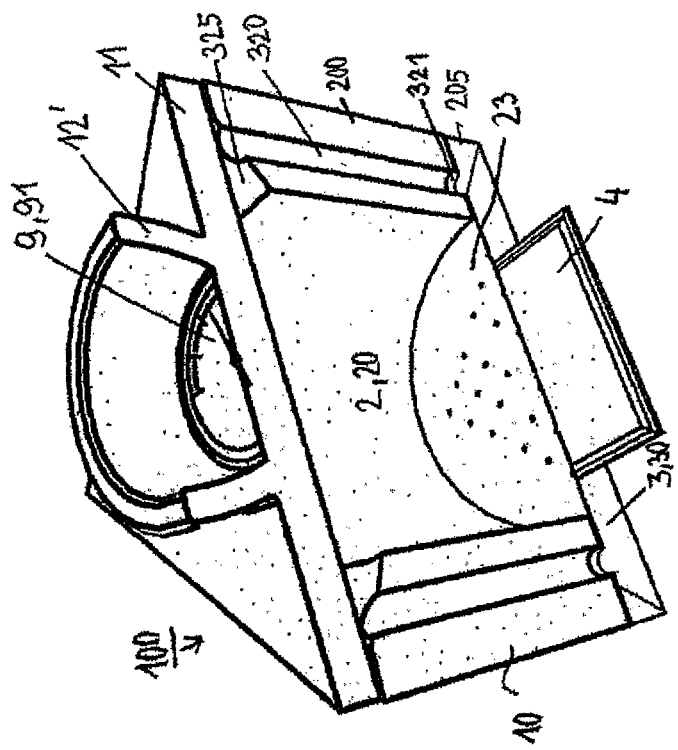
Figure 5:
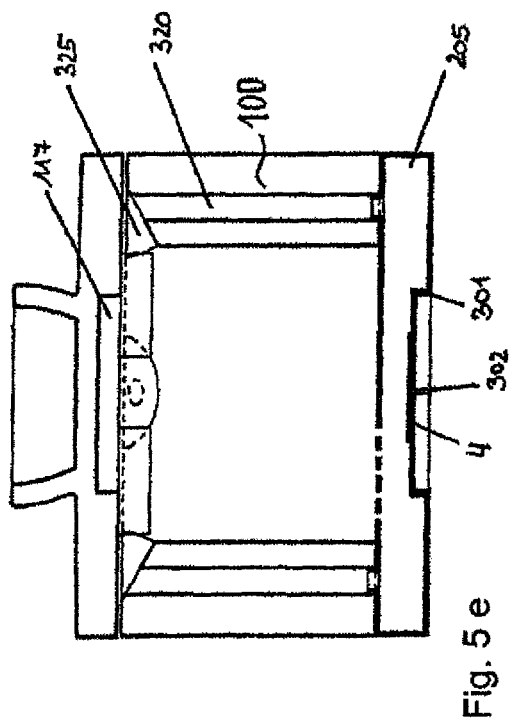
Figure 5:
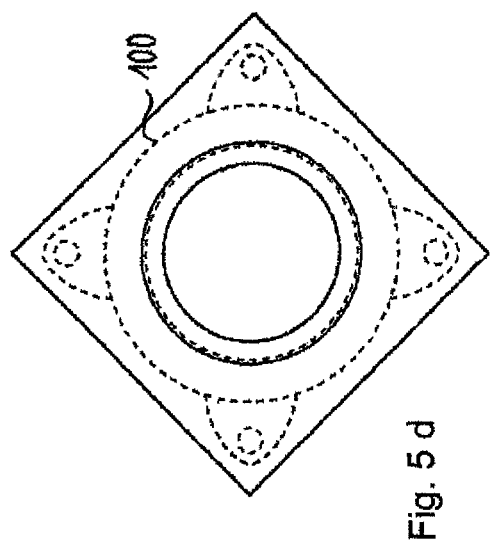
Figure 6:
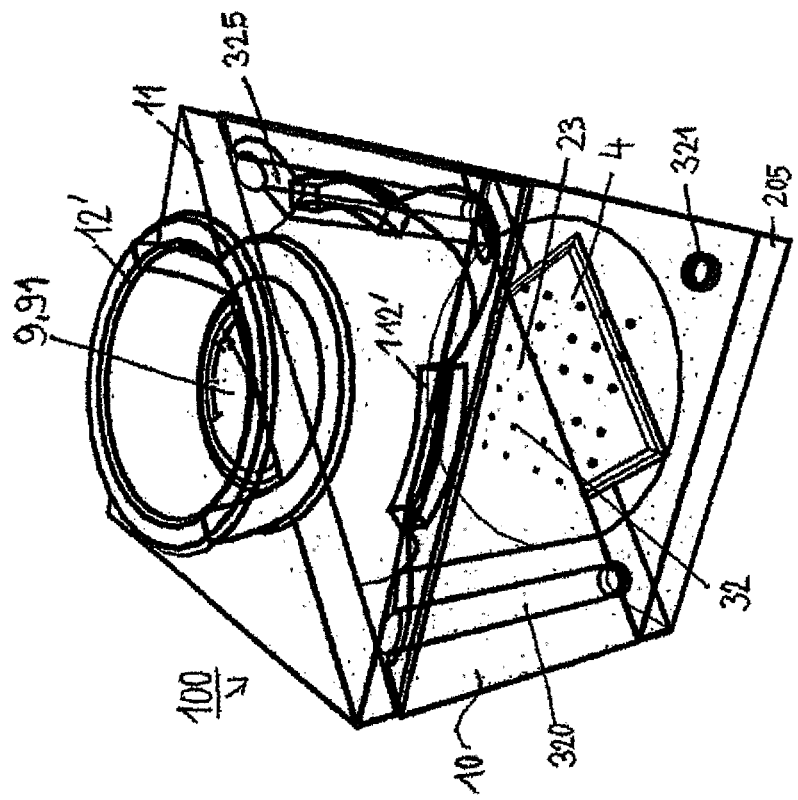
Figure 6:
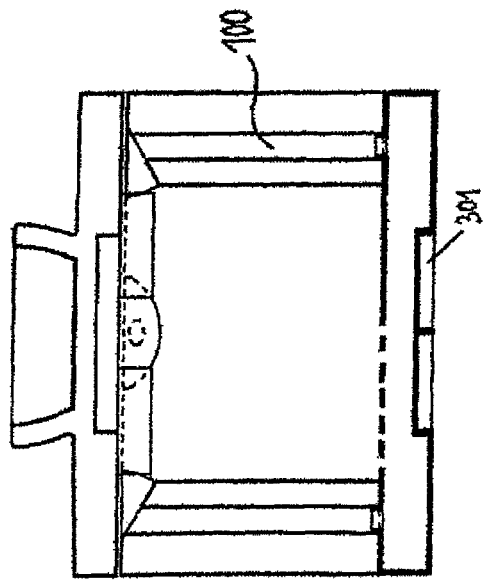
Figure 6:
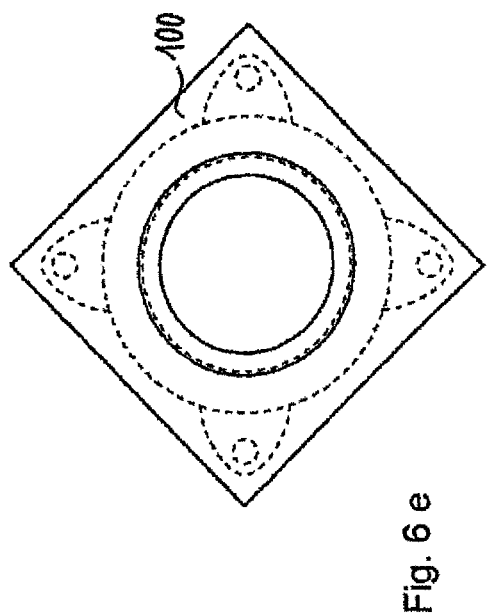
Figure 8:
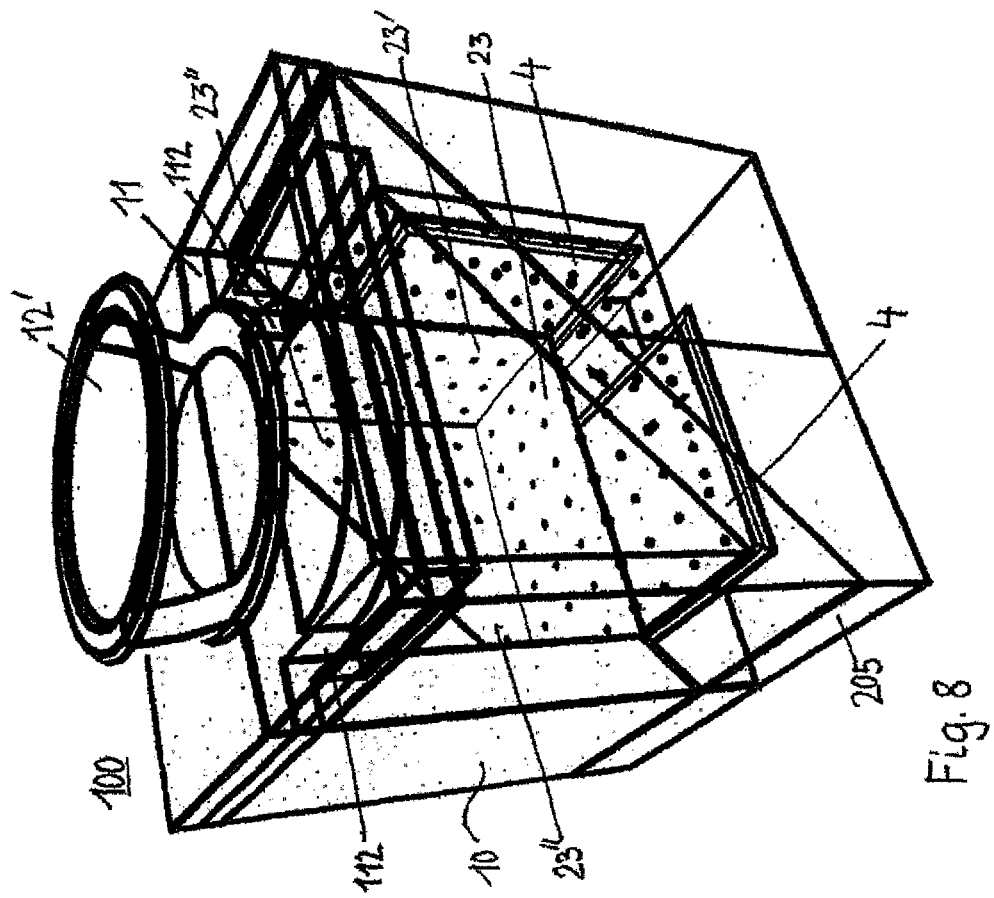
FIGS. 8a, 8b, 8c show another embodiment of the container, with the sealing cap having a shell-like handle.
Figure 8:
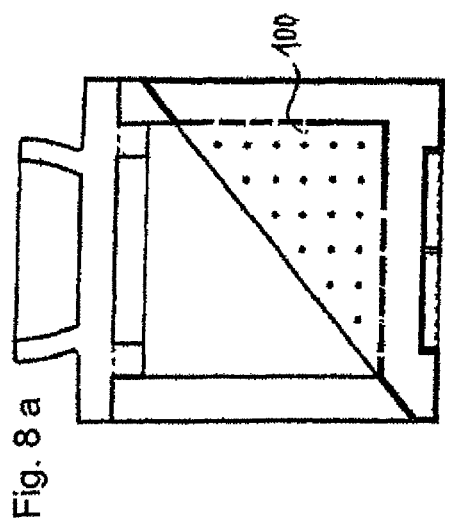
Figure 8:
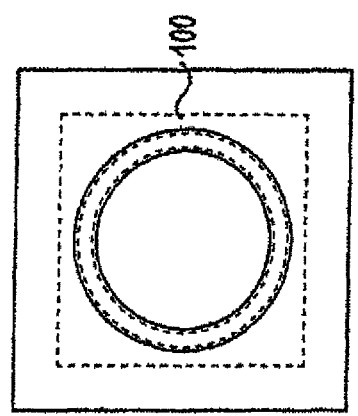

FIGS. 1, 1a, and 1b show the oblique, sectional and plan views of the new container 100 for storage of products sensitive to the degree of humidity 5 with a separate base 205, having an—in this case cylindrical—inner space 2 with a sealing cap 11. The tea container 10 has an aroma-neutral metal separating wall 23 in the base 205 with atmosphere exchange and connection recesses 32, whereby the base 205 contains the approximately flat box-like inner space 3 with a sealing cap 31, to seal tight against the outside atmosphere. The base 205 may also have a separate drawer 4 into which the humidity regulation means or the like, may be inserted.

The inner space 3, sealable against the outside atmosphere, is preferably a flat, packaged or shaped humidity regulation means 4 which, for example, contains an aroma-neutral desiccant, e.g. based on silicon dioxide or silicates.

The multiple round cross-section recesses or holes 32 uniformly distributed in the separating wall 23 form the atmosphere exchange and connection bridges, and provide uniformly prevalent inner atmospheres 20 and 30 in the inner space 2 and 3, with the inner space 2 for the storage of products sensitive to the degree of humidity 5, and with an overall atmosphere 230 in the inner space 3 for housing the humidity regulation means 4 without local micro-humidity gradients.

In this case, the square sealing cap 11 is seated on the container 10 in order to seal the entire wall 200 for the products sensitive to the degree of humidity 5, and has a likewise precisely adapted sealing circular protrusion 112 with a flattened cylindrical-shaped recess 116, as well as the usual handle 12a in the cylindrical inner space 2 for storage of the tea 5.

In a particularly preferred way, both the sealing cap 11 as well as the product container 10 are made of a light-transparent, preferably clear transparent material, in particular glass or crystal material, for example based on acrylic, in order to enable one to easily observe and control visually from outside at any time at least the state of the product sensitive to the degree of humidity stored in the inner space 2.

While otherwise using the same reference numerals, FIGS. 2, 2a, and 2b show an outwardly also approximately cubic new container 100 for constant storage of a product sensitive to the degree of humidity, whereby the same, also here separate, base 205 has a separating wall 23 with exchange and connection openings 32, and whose inner space 2 has a circular-cylindrical shape for the storage of the product sensitive to the degree of humidity.

To ensure a uniform atmosphere 230 in the two inner spaces 2 and 3 without local humidity gradients, going vertically upwards from the lower Inner space 3 and close to its corners and edges of the container 10, there are four atmosphere exchange and connection bridges in the form of the thick material edge regions of the product container 10 and atmosphere connection channels 320 with a cylindrical cross-section, which end in the vicinity of the upper side of the container 10 in an approximately shell-like extension 325 slanting downwards with respect to the cylindrical inner space 2.

In this case the sealing cap 11 has four sub-protrusions 112', each of which ends on both sides where the extensions 325 of the atmosphere exchange channels 320 begin. At the locations of the missing sub-protrusions 112' (see FIGS. 2a, 2b) In the sealing cap 11, approximately shell-like recesses 115 are each respectively precisely tailored to the extensions 325 of the channels 320 in order to be suitable for the inner space 2 also itself expanding, whereby the atmosphere 30 is, as it were, deflected into the atmosphere 20 of the inner space 2 for the product sensitive to the degree of humidity 5 by means of the humidity regulation means 4 in the inner space 3, so that the same overall atmosphere 230 prevails in the inner spaces 2 and 3 without any local humidity gradients.

While otherwise using the same reference numerals, FIGS. 3, 3a, and 3b show a partially sectioned perspective view of an inventive conservation container 100 that has three adjacent separating walls 23, 23', 23' with a plurality of evenly-spaced atmosphere exchange openings 32, under and behind which is respectively arranged a respective inner space 3, 3', 3" to house a humidity regulation means 4 (not shown).

In this case and unlike the container 100 of FIG. 2, the sealing cap 11 has an outer flat square prismatic protrusion 112 with a flat-cylindrical recess 116, which is appropriately introduced into an upper square opening of the new container 10.

While otherwise using the same reference numerals, FIGS. 4, 4a, and 4b show an inclined and sectional view of an inventive product conservation container 100 with an essentially cubic inner space 2, whereby it has not only a separate base 205 with a lower inner space 3 to house the humidity regulation means 4 with a separating wall 23 with atmosphere exchange recesses 32, but it also has two, optionally up to four, further inner spaces 3', 3" arranged respectively in the adjacent vertical wall portions 202 and 203 of the container 10, whereby each is optionally designed for the addition of two or more further packets of humidity regulation means 4 that are intended to be reasonably identical to one another.

The sealing cap 11 of the container 10 shown in this figure has on the outside, corresponding to the cubic inner space 2, a square sealing protrusion 112 in the upper region of the four wall sections 201 to 204.

While otherwise using the same reference numerals, FIGS. 5, 5', 6, 6', 7 and 8, each with diagram FIG. a) and b), show very similar containers 100 to those shown in FIGS. 1 to 4, but the sealing cap 11 has a recessed handle 12', not a handle knob 12.

The sectional view of FIG. 5a shows a container 100 according to the invention with a base 205, into the inner space 2 of which an insertion or sealing cap 301, to which a humidity regulation means 4 is applied, can be introduced from below. In addition, two perpendicular atmosphere connection tubules 320, serving as "AVAB," can be connected, which flow into approximately shell-like, downward-directed extensions 325 into the inner space 2 for storing the moisture-sensitive product 5.

In addition, FIG. 5' shows how a hygrometer 9 with pointer and scale—readable from the outside—is placed in a recess 115 in the sealing cap 11, as shown in FIG. 5'a.

While otherwise using the same reference numerals, FIGS. 9a and 10a show an inclined and sectioned front side of a container 10 for products sensitive to the degree of humidity with the inner space 2 from the front, whereby, in each case, the rear back wall 203 has a separating wall 23", while further in these figures can be seen in section the openings 32 of FIGS. 9a, 9b, both in the base-side separating wall 23 as well as in the side separating wall 23'.

FIGS. 9a and 10a show on the lower side from below the downwardly open sealing cap 301, preferably screwable, with the auxiliary web 302, by means of which the lower inner space 3 may be closed or opened and through which, for example, the humidity regulation means 4 may be inserted into the inner space 3, which may be placed through the opening for the sealing cap 301 into the inner space 3. Furthermore, both FIGS. 9a, 9b and 10a, 10b show that there are no separating wails or the like between the two inner spaces 3, 3' separated by the separating walls 23, 23' of the inner space 2.

FIGS. 9b and 10b respectively show the product container 10 shown in FIGS. 9a and 10a in a view from above.

While otherwise using the same reference numerals, FIGS. 11a and 12a show respectively the same cubic product container 10 with the cubic inner space 2 and three interconnected inner spaces 3, 3', 3" for a humidity regulation means 4, but each having two different kinds of upper sealing caps 11, in one case with a conventional handle knob 12 and in the other case with a shell-like grip-friendly handle 12' allowing a view through the base 121 into the inner space 2 containing the product sensitive to the degree of humidity without any distortion or the like.

The protrusion 112 of the sealing cap 11 has a square-prismatic shape on the outside and a flat-cylindrical shape on the inside. A humidity meter 9 may be fitted in the flat-cylindrical space 116 with a display side 91 that is clearly visible at all times through the flat base 121 of the shell handle 12' as shown in FIG. 12a.

FIGS. 11b and 12b respectively show the container 100 shown in FIGS. 11a and 12a each with its respective sealing cap 11 in a view from above.

While otherwise using the same reference numerals, FIGS. 13a, 14a and 15a show, on the one hand, the upper part of a bias-cut product container 10 with partially shown side walls 202, 204 and the rear wall 203, and, further, a sealing cap 11 with the handle knob 12 and finally one with a shell handle 12', whereby a humidity meter 9 with a display side 91 may be installed in each case in the flat-cylindrical space 116 surrounding the protrusion 112.

FIGS. 13b, 14b and 15b show the product container 10 with its two sealing caps 11 respectively in a view from above, whereby FIGS. 14b and 15b show the clear visibility of the pointer and the scale 91 of the humidity meter 9.

While otherwise using the same reference numerals, FIGS. 16a and 17a respectively show in sectional view a removable base 205 of a product container 10 with the upwardly open connections 321 for the atmosphere connection channels, and the separating wall 3 with the openings 32 in the separating wall 23 and the sealing cap 301 with central web 302 and humidity regulation means 4.

FIGS. 16b and 17b show in plan view the base 205 of the product container 10 with the vertical cutting planes AA and BB to FIGS. 16a and 17a.

Figure 19:
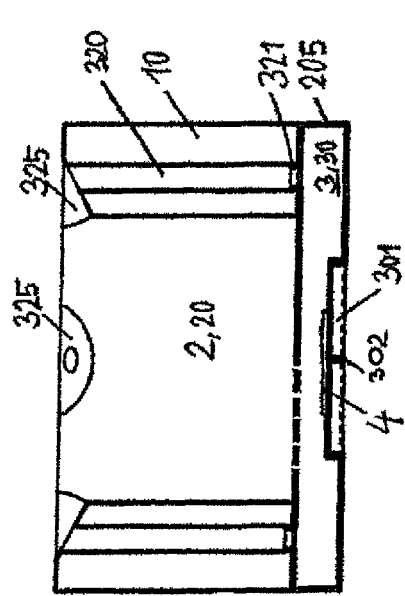
FIGS. 18a, 18b, 19a, 19b, 19c show the body of the actual container for products sensitive to the degree of humidity with the said base.
Figure 19:
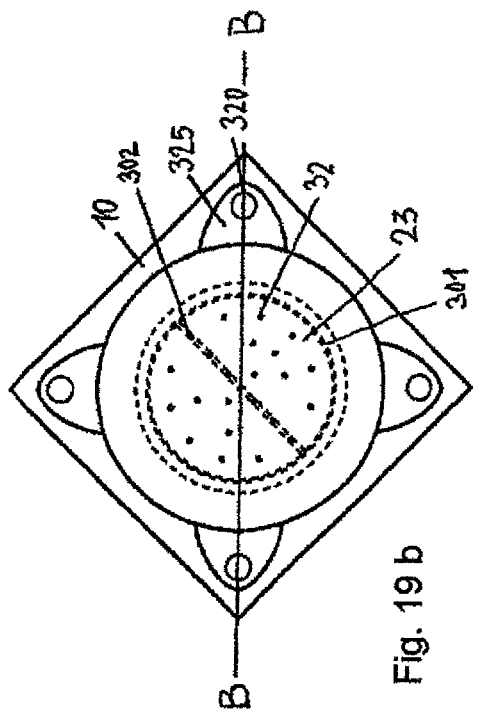
Figure 18:
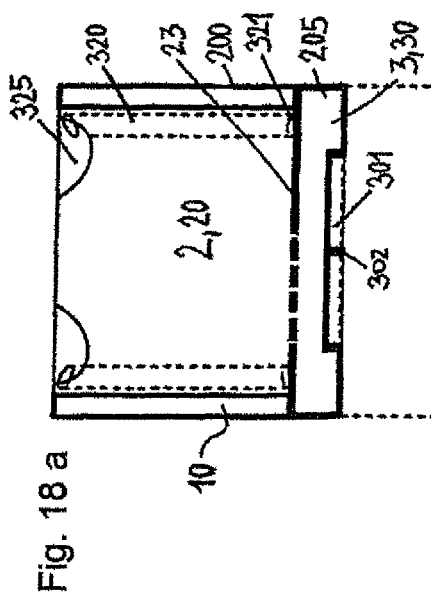
Figure 18:
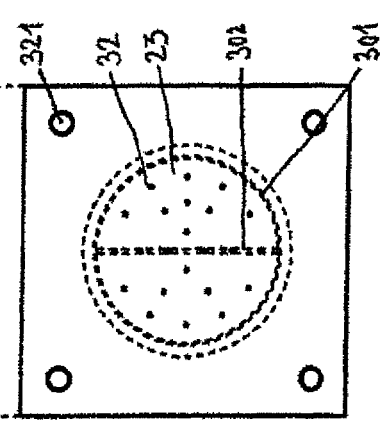

FIGS. 18a and 19a show—while otherwise using the same reference numerals—the container 10 equipped with the removable base 205 and the inner space 2, whereby the atmosphere channels 320 mountable on the open tube entrances 321 are visible, and which end in the shell-like extensions 325 in the vicinity of the visible upper plane of the container 10.

It can further clearly be seen from FIGS. 18b and 19b, how, in the base 205, a separate base insert and sealing cap 301 through whose opening the humidity regulation means 4 may be inserted and screwed, and further, the container 10 with the same base 205 with the four connections 321. Also shown are the parallel and diagonally oriented vertical sectional planes AA and BB through the base 205 and the container 10 with the container base 205.

FIG. 19c shows the base insert or sealing cap 301 more closely. The container base 205, in particular metal-finished, with the sockets 321 and the inner space 3 of the humidity regulation means 4, has a central lower opening with a socket with a female thread projecting into the inner space 3 and into which the open sealing cap 301 with its male thread is screwed downwards, whereby the central web 302 serves, in particular, as a handle for the practical screwing and unscrewing of the sealing cap 301 into the socket of the container base 205.

While otherwise using the same reference numerals, FIGS. 20a and 21a show two sectional views through the same container 100, whereby the sealing cap 11 has a handle knob 12, and whereby the inner space 3 for housing the humidity regulation means 4 forms the base 205 of the product container 10.

Both figures show how the atmosphere exchange channels 320 pass out of the inner space 3 and sockets 321 and end on the upper side in the shell-like recesses 325 that slope downwards with respect to the inner space 2 for the product sensitive to the degree of humidity.

The sealing cap 11 here has four circular sectoral protrusions 112' which are absent at the shell-like recesses 325 of the tea container 10, so that the coherence of the atmosphere 30 in the atmosphere connection channel 320 and atmosphere 20 in the tea inner space 2 are ensured. In addition, it has a recess 117 in which a measuring device readable from the outside can be placed.

FIGS. 20b and 21b respectively show the view from above and the two cutting planes AA and BB through the tea container 100 shown in FIGS. 20a and 20b in sectional view.

While otherwise using the same reference numerals, FIGS. 22a and 23a clearly show in two different sections, the actual body 10' of the product container 10 shown in FIGS. 20a and 21a with the atmosphere connection channels 320 and the upper-side shell-like extensions 325, while FIGS. 22b and 23b show the vertical cutting planes AA and BB through the body 10' of the product container 10.

While otherwise using the same reference numerals, the sectional views of FIGS. 24a, 25a and 26a show the sealing cap 11 with the handle knob 12 with its own, flat cylindrical recess 117, while FIGS. 24c and 26b show the vertical cutting planes A-A and B-B through the sealing cap 11 shown in FIGS. 24a and 26a.

While otherwise using the same reference numerals, FIGS. 27a and 28a show two sectional views through the respective same inventive container 100 with a sealing cap 11 with the handle knob 12, whereby the inner space 3 to house the humidity regulation means 4 forms the removable base 205 of the product container 10.

It is shown here how the atmosphere exchange and connection channels 320 pass out of the inner space 3, and open into the shell-like recesses 325 on the upper side and that slope downwards with respect to the inner space 2 for the product sensitive to the degree of humidity.

The above-mentioned sealing cap 11 itself also has recesses 115 matching the upper-side recesses 325 of the atmosphere exchange and connection channels 320 to compensate for the overall atmosphere 230.

While otherwise using the same reference numerals, FIGS. 27b and 28b show top views of the sealing cap 11, whereby the cutting planes A-A and B-B leading to the sectional views of FIGS. 27a, 28a are shown again.

While otherwise using the same reference numerals, FIGS. 29a and 30b show two sectional views of the same sealing cap 11 with the handle knob 12 according to the invention, once along a vertical plane AA parallel to the side and once along a diagonal plane BB according to FIGS. 29b and 30b.

It can clearly be seen here that the sealing cap 11 on the lower side has four rather shell-like recesses 115 for connecting the atmospheres 230 in the previously shown atmosphere-exchange channels 320 with the atmosphere 20 in the inner space 2.

While otherwise using the same reference numerals, FIGS. 31a and 32a show sectional views of the new container 100 for storing products sensitive to the degree of humidity with a sealing cap 11 with the handle knob 12, which are completely analogous to those described in FIGS. 20a and 21a for such a container 100 with a sealing cap 11 with a handle knob 12', while FIGS. 31 and 32b show respectively the container 100 from above with the two vertical planes AA and BB.

While otherwise using the same reference numerals, FIGS. 33a, 34 and 35a show respectively in sectional view the same sealing cap 11 with its square outer shape or outer configuration, with the handle knob 12' with four sectorally circular partial protrusions 112', whereby a circular flat-cylindrical recess 117 is arranged in the sealing cap 11 itself, whereby a humidity meter 9 can be fitted in turn, while the thickness of the sealing cap 11 is much smaller than usual to further facilitate the readability of the display side 91 with its scale and pointer.

While otherwise using the same reference numerals, FIG. 33b shows the view of the sealing cap 11 from below, while FIG. 33c shows the view from above.

While otherwise using the same reference numerals, FIGS. 33c and 35b show the views of the sealing cap 11 with the handle knob 12' from above, while the cutting planes A-A and B-B through the sealing cap 11 can also be seen, resulting in the sectional views of FIGS. 33a and 35a.

While otherwise using the same reference numerals, FIGS. 36a and 37a respectively show a new container 100 with a sealing cap 11 with the handle knob 12', while FIGS. 36b and 37b show views of this container 100 from above with the different cutting planes AA and BB.

While otherwise using the same reference numerals, FIGS. 29 and 30 show the sectional and plan views of the sealing cap 11 with the handle knob 12' shown in FIGS. 38a, 39a, as well as 38b and 39b.

Finally, while otherwise using the same reference numerals, FIGS. 40 and 41 show different inclined plan views of a new multiple and/or multi-product storage set 8 with a hinged cap 81, for example, of precious wood, with humidity and/or temperature displays 82 and 83, which may contain a total of six closely adjacent containers 100 for the individual storage, for example, of various products of different types sensitive to the degree of humidity, whereby each of them may have a different degree of humidity in the atmosphere in its Inner space 2.

The humidity, as well as possibly also the temperature, are shown on a humidity meter 9 arranged directly under the base 121 of the handle knob 12' of the sealing cap 11 of each of the containers 100.

It can also be seen in FIGS. 40 and 41 how the supply of the humidity regulation means 4, in this case, in the three or two of the total of six possibly different degrees of humidity of the inner atmospheres of their inner spaces 3 for housing the humidity regulation means 4 of the new containers 100, functions for the storage of products sensitive to the degree of humidity.

The invention claimed is:

1. A container for maintaining an optimum degree of humidity of an inner atmosphere to retain a specific aroma during conservation and storage of a product that is sensitive to the degree of humidity, said container comprising:

a body defining a first inner space for long term reception and storage of the product whose quality is to be preserved in full, said container having a second inner space disposed adjacent to the first inner space for allowing placement of a first humidity regulator, said second inner space having a volume which is less than a volume of the first inner space, said first and second inner spaces being connected via a plurality of atmosphere connection and exchange elements so as to enable communication of an atmosphere in the first inner space with an atmosphere in the second inner space to thereby establish a unified overall atmosphere which has a defined degree of humidity without local humidity gradient;

a sealing cap detachably secured to the body to seal the first inner space against the outside atmosphere; and a first separating wall disposed between the first and second inner spaces, wherein the atmosphere connection and exchange elements include recesses, holes or tubules formed in the first separating wall, wherein the body has a cubic, uniform four-sided prismatic, or cylindrical geometric outer shape, said first inner space having a cylindrical shape, said atmosphere connection and exchange elements including four channels extending separated from the first inner space in parallel relationship to inner edges or gusset areas of the body from the second inner space through the first separating wall upwards such that an upper end of the channels has a shell shaped cylindrical configuration which widens obliquely downwards into the first inner space, said upper ends of the channels being inclined downwards with shell-shaped extensions for feeding into the first inner space.

2. The container of claim 1, wherein the body is made of a transparent material.

3. The container of claim 1, wherein the second inner space has a flat configuration which is sealed tight against the outside atmosphere.

* * * * *